US011151599B2

(12) United States Patent
Cimino et al.

(10) Patent No.: US 11,151,599 B2
(45) Date of Patent: Oct. 19, 2021

(54) METHODS FOR DETERMINING ADVERTISEMENT USAGE BY PROXY LOG DATA

(71) Applicant: The Nielsen Company (US), LLC, New York, NY (US)

(72) Inventors: Susan Cimino, Odessa, FL (US); Stanley Woodruff, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 541 days.

(21) Appl. No.: 15/803,548

(22) Filed: Nov. 3, 2017

(65) Prior Publication Data

US 2019/0139075 A1 May 9, 2019

(51) Int. Cl.
*G06Q 30/02* (2012.01)
*G06F 16/903* (2019.01)
*G06F 16/335* (2019.01)

(52) U.S. Cl.
CPC ....... *G06Q 30/0242* (2013.01); *G06F 16/337* (2019.01); *G06F 16/90335* (2019.01)

(58) Field of Classification Search
USPC ...................................................... 705/14.1
See application file for complete search history.

(56) References Cited

U.S. PATENT DOCUMENTS

| 6,591,248 | B1 | 7/2003 | Nakamura et al. |
| 7,260,837 | B2 | 8/2007 | Abraham et al. |
| 7,475,404 | B2 | 1/2009 | Hamel |
| 7,536,459 | B2 | 5/2009 | Johnson et al. |
| 7,840,438 | B2 | 11/2010 | Carson et al. |
| 8,204,928 | B2 | 6/2012 | Elven |
| 8,311,885 | B2 | 11/2012 | Kennedy et al. |
| 8,769,080 | B2 | 7/2014 | Cancel et al. |
| 9,104,960 | B2 | 8/2015 | Bottou et al. |
| 9,129,032 | B2 | 9/2015 | Cancel et al. |
| 9,292,515 | B1 | 3/2016 | Zigmond et al. |
| 9,501,662 | B2 | 11/2016 | Rosner et al. |
| 2006/0212349 | A1 | 9/2006 | Brady |
| 2008/0183806 | A1 | 7/2008 | Cancel et al. |
| 2011/0307331 | A1 | 12/2011 | Richard et al. |
| 2012/0095850 | A1 | 4/2012 | Hamel |

(Continued)

FOREIGN PATENT DOCUMENTS

WO 2008109743 9/2008

*Primary Examiner* — Afaf Osman Bilal Ahmed
(74) *Attorney, Agent, or Firm* — Hanley, Flight & Zimmerman, LLC

(57) ABSTRACT

Methods, apparatus, systems and articles of manufacture to determine click-through rates for advertisements are disclosed. The apparatus includes an application identifier to identify a first application associated with a first request received at a proxy server; a record searcher to search records in a data store within a first threshold of the first request to detect a second request; and a response detector to detect a response to the second request. The application identifier further to identify a parent advertiser based on content of the response to the second request. The record searcher is further to search the data store to identify records within a second threshold of the second request to determine if the second request is directed to the parent advertiser. The apparatus further includes a reporter to record a click-through event or a non-click-through event as a result of the searching.

24 Claims, 13 Drawing Sheets

(56) References Cited

U.S. PATENT DOCUMENTS

| | | |
|---|---|---|
| 2014/0200990 A1 | 7/2014 | Caceres |
| 2014/0250223 A1 | 9/2014 | Heffernan et al. |
| 2015/0262201 A1 | 9/2015 | Rao et al. |
| 2016/0292170 A1 | 10/2016 | Mishra et al. |
| 2017/0083941 A1 | 3/2017 | Biswas et al. |

400

| | 410 | 420 | 430 | 440 |
|---|---|---|---|---|
| | DEVICE IDENTIFIER | PANELIST IDENTIFIER | TIMESTAMP | REQUEST |
| 450 | Apple® iPhone® | 50000 | 6:00:00 PM | GET http://app.espn.com/home.html HTTP/1.1<br>Host: proxy.MonitoringEntity.com:50000<br>User-Agent: SportCenter<br>... |
| 460 | Apple® iPhone® | 50000 | 6:01:23 PM | GET http://app.espn.com/article1.html HTTP/1.1<br>Host: proxy.MonitoringEntity.com:50000<br>User-Agent: SportCenter<br>... |
| 470 | Apple® iPhone® | 50000 | 6:04:43 PM | GET http://mail.company.com/ HTTP/1.1<br>Host: proxy.MonitoringEntity.com:50000<br>User-Agent: iPhone Mail<br>... |
| 480 | Apple® iPhone® | 50000 | 6:15:39 PM | GET http://app.espn.com/article2.html.html HTTP/1.1<br>Host: proxy.MonitoringEntity.com:50000<br>User-Agent: SportCenter<br>... |
| 490 | Apple® iPhone® | 50000 | 6:17:42 PM | GET http://www.weather.com/home.html HTTP/1.1<br>Host: proxy.MonitoringEntity.com:50000<br>User-Agent: Apple® Safari®<br>... |

| PANELIST IDENTIFIER | ADVERTISEMENT IDENTIFIER | CLICK THROUGH/NON-CLICK THROUGH | NEARBY ADVERTISEMENT IDENTIFIER |
|---|---|---|---|
| 50000 | A | CLICK THROUGH | NONE |
| 50000 | A | CLICK THROUGH | B |
| 50000 | A | NON-CLICK THROUGH | B,C |
| 50000 | A | CLICK THROUGH | C |
| 50000 | B | NON-CLICK THROUGH | A |

METHODS FOR DETERMINING ADVERTISEMENT USAGE BY PROXY LOG DATA

FIELD OF THE DISCLOSURE

This disclosure relates generally to advertisement usage, and, more particularly, to determining advertisement usage by proxy log data.

BACKGROUND

Media and audience monitoring companies desire to gain knowledge on how users interact with their computing devices (e.g., handheld mobile devices such as smartphones). For example, monitoring companies want to monitor Internet traffic to and/or from the computing devices to, among other things, monitor exposure to advertisements, determine advertisement effectiveness, determine user behavior, identify purchasing behavior associated with various demographics, measure application usage, etc. Some known systems have utilized a proxy server to monitor Internet content being transmitted to and/or from a monitored device.

BRIEF DESCRIPTION OF THE DRAWINGS

FIG. 4 is an example data table of requests stored in the data store by the proxy of FIG. 1.

FIG. 11 illustrates an example report that may be created by the example reporter of FIG. 1.

The figures are not to scale. Wherever possible, the same reference numbers will be used throughout the drawing(s) and accompanying written description to refer to the same or like parts.

DETAILED DESCRIPTION

Proxy servers relay requests for media (e.g., images, video, webpages, etc.) from a requesting device to a server and, in turn, relay a response from the server to the requesting device. Mobile devices commonly include multiple communication options such as, for example, a Wi-Fi radio, a cellular radio, etc. In some examples, mobile devices can be configured to route requests for media to (and/or through) a proxy server.

In some examples, the communication options of the mobile device are configured separately for use with the proxy. For example, a Wi-Fi radio may be configured using a proxy auto configuration (PAC) file, while a cellular radio may be configured using a profile. Example systems, methods, and apparatus for configuring a mobile device to interact with a proxy are disclosed in U.S. Patent Application Publication No's 2012/0042005, 2012/0042367, 2013/0005296, each of which are hereby incorporated by reference in their entirety.

Example systems, methods, and apparatus disclosed herein facilitate tracking of advertisements associated with messages (e.g., hypertext transfer protocol (HTTP) messages) received at a proxy to credit the advertisements with a click-through or a non-click-through event. In some examples, browser traffic (e.g., traffic from a browser application such as, for example, Apple® Safari®) is analyzed to credit advertisements and/or page views with a click-through event. Some applications utilize protocols other than HTTP such as, for example, HTTP Secure (HTTPS). Accordingly, while the examples disclosed herein are described with reference to the HTTP protocol, any other past, present, and/or future protocol and/or format of communication may additionally or alternatively be used such as, for example, HTTP secure (HTTPS), File Transfer Protocol (FTP), etc.

Figure 1:
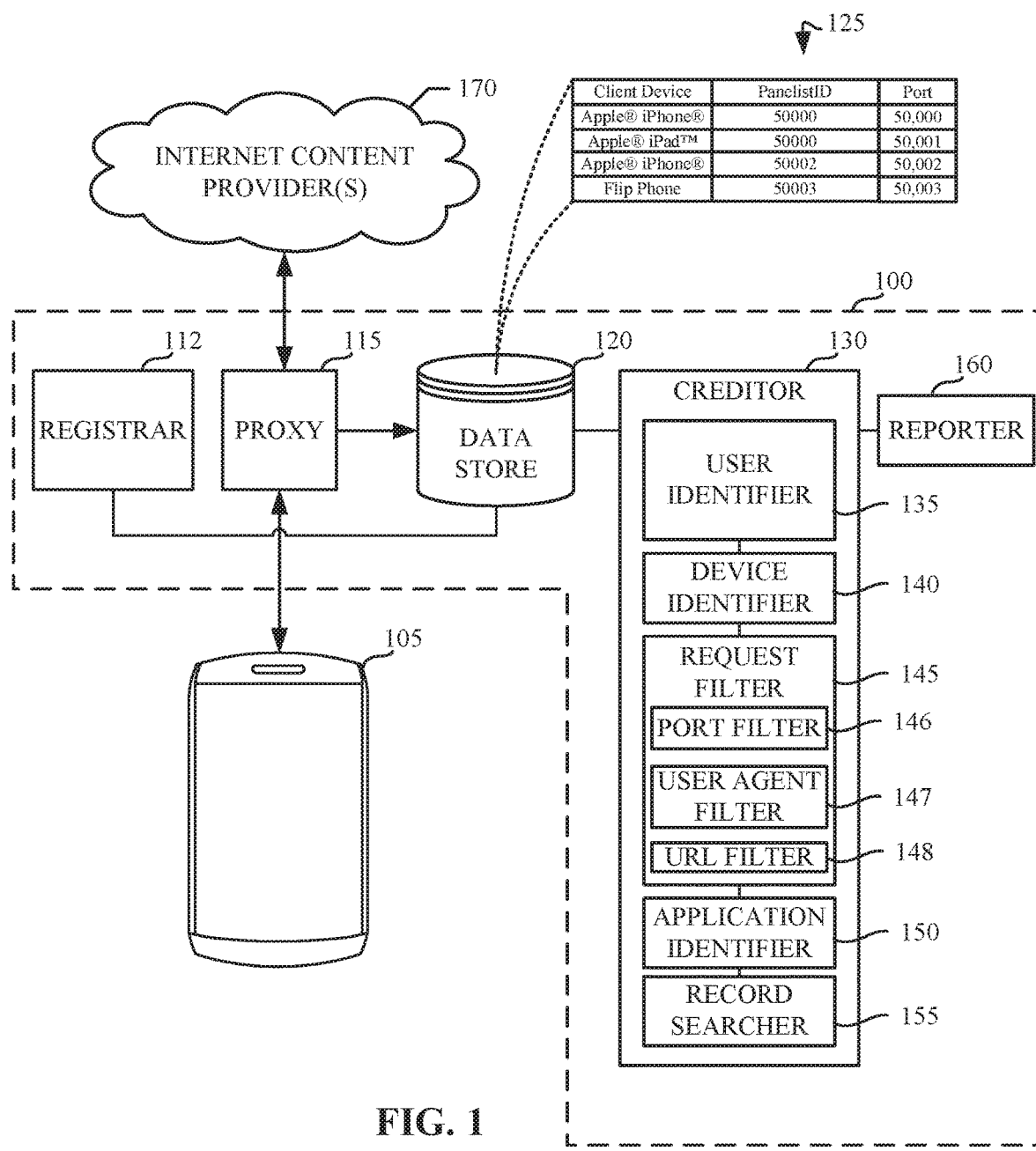
FIG. 1 is a block diagram of an example system constructed in accordance with the teachings of this disclosure to monitor advertisement usage.

FIG. 1 is a block diagram of an example system 100 constructed in accordance with the teachings of this disclosure to monitor Internet activity. The example system 100 monitors Internet traffic to and/or from handheld mobile devices (e.g., a mobile device 105). The monitored Internet traffic between the monitored devices (e.g., the mobile device 105) and Internet sites (e.g., Internet content provider(s) 170) is routed to the example monitoring system 100. As shown in FIG. 1, the traffic passes through a proxy 115 of the example monitoring system 100. The example monitoring system 100 includes a registrar 112, the proxy 115, a data store 120, a creditor 130, a user identifier 135, a device identifier 140, a request filter 145, a port filter 146, a user agent filer 147, a Universal Resource Locator (URL) filter 148, an application identifier 150, a record searcher 155, and a reporter 160.

The example mobile device 105 of FIG. 1 is a handheld mobile device. While in the illustrated example the mobile device 105 is shown as a cellular phone, any other type of device may be used. For example, other types of phones (e.g., an Apple® iPhone®), a laptop computer, a desktop computer, a personal digital assistant (PDA), a netbook, or a tablet computer (e.g., an Apple® iPad™) may additionally or alternatively be used. The mobile device may be implemented with any mobile operating system, and may be implemented with any type of hardware and/or form factor. In the illustrated example, the mobile device communicates via a wireless interface. However, any other type(s) of communication interface may additionally or alternatively be used such as, for example, an Ethernet connection, a Bluetooth connection, a Wi-Fi connection, a cellular connection (e.g., a Time Division Multiple Access (TDMA) connection, Code Division Multiple Access (CDMA) connection, Worldwide Interoperability for Microwave Access (WiMAX) connection, Long Term Evolution (LTE) connection, etc.)

In the illustrated example, the mobile device 105 is associated with a panelist participating in a monitoring service. Although the example system of FIG. 1 is a panelist-based system, non-panelist and/or hybrid panelist systems may alternatively be employed. In the panelist system of the illustrated example, demographic information is obtained from the user when the user joins and/or registers for the panel. The demographic information may be obtained from the user via a telephone interview, by having the user complete an online survey, etc. Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, a first panelist is associated with the mobile device 105. In the illustrated example, the mobile device 105 is owned, leased, or otherwise belongs to the first panelist. The monitoring entity of the illustrated example does not provide the mobile device to the first panelist. However, in other systems, panelists may be provided with mobile devices to participate in the panel. While in the illustrated example, the mobile device 105 is associated with a single panelist, the mobile device 105 may alternatively be associated with more than one panelist. For example, a family may have a single mobile device (e.g., a tablet computer) that may be shared amongst multiple users. The sharing of a client device is less common when the client device is a cellular phone than when the client device is a portable computer (e.g., an Apple® iPad™).

In the illustrated example, the example monitoring system 100 is shown as multiple computing systems. However, the monitoring system 100 may alternatively be comprised of a single computing system. In the illustrated example, the monitoring system 100 includes the example registrar 112, the example proxy 115, the example data store 120, the example creditor 130, and the example reporter 160. However, additional structures may be implemented to carry out one or more portions of the functionalities implemented by the example proxy 115, the example data store 120, the example creditor 130, the example reporter 160, and/or other structures associated with one or more additional and/or alternative functions.

The registrar 112 of FIG. 1 is implemented by a logic circuit such as a processor executing computer readable instructions, but it could additionally or alternatively be implemented by an Application Specific Integrated Circuit (ASIC(s)), a Programmable Logic Device (PLD(s)), a Field Programmable Logic Device (FPLD(s)), an analog circuit, and/or digital circuitry. In the example of FIG. 1, the registrar 112 receives registration information from the panelist and stores a record identifying the panelist and/or their respective client device 105. In the illustrated example, the record identifying the panelist is a port number assigned to the panelist (e.g., the port assigned to the panelist may be 50,000 and the record identifying the panelist may be 50,000). In the illustrated example, the received registration information includes demographic information. However, any other information may additionally or alternatively be collected. The registration information may include, for example, information identifying the model of the mobile device 105 associated with the panelist, a mailing address associated with the panelist, an email address associated with the panelist, a phone number associated with the mobile device 105, a unique identifier of the panelist and/or mobile device 105 (e.g., a social security number of the panelist, a phone number of the mobile device 105, a zip code of the panelist, and/or any combination or derivation of any information related to the panelist and/or mobile device 105), the age of the panelist, the gender of the panelist, the race of the panelist, the marital status of the panelist, the income of the panelist and/or the household of the panelist, the employment status of the panelist, where the panelist typically intend to use their device, how long the panelist has owned their device, the education level of the panelist and/or any other information related to the panelist and/or the mobile device 105.

In the illustrated example, the registration data is received by the registrar 112 via an electronic interface (e.g., by a panelist entering data into a form at a website or answering survey questions at a website). However, the registrar 112 may receive the registration data via any other means. For example, the registrar may receive the registration data via a personal interview (by telephone or in person), a telephone interface, direct mailing, purchased lists, etc. While the registrar 112 of the illustrated example is an electronic system, the registrar 112 may alternatively be implemented manually by a person or group of people collecting and entering the registration data into the data store 120.

Upon receiving the registration data, the registrar 112 of the illustrated example creates a record associating the panelist and device identifier information with the collected demographic information. The registrar 112 may also assign a unique alphanumeric identifier to the panelist or device. The identifier may be based on, for example, a serial number of the mobile device 105. The record is stored in the data store 120. In the illustrated example, the registrar 112 also assigns a unique port number to the panelist and/or the mobile device 105 and stores the port number in the record (or in association with the record for that panelist and/or mobile device). As noted above, in addition to assigning and storing the port number, the registrar may assign and store additional identifiers. For example, the registrar may assign and store an identifier of the client device and/or the panelist. The panelist or client device identifier(s) may be the same as the port number, or they may be different from the port number.

While in the illustrated example port numbers are used to identify the panelist and/or mobile device 105, any other way of identifying the panelist and/or mobile device may additionally or alternatively be used. For example, a username and/or password may be used to identify the panelist and/or mobile device 105.

The data store 120 may be any device for storing data such as, for example, flash memory, magnetic media, optical media, etc. Furthermore, the data stored in the data store 120 may be in any data format such as, for example, binary data, comma delimited data, tab delimited data, structured query language (SQL) structures, etc. While in the illustrated example the data store 120 is illustrated as a single database, the data store 120 may be implemented by multiple databases. The data store 120 receives and stores identifiers associating a panelist with the mobile device 105 from the registrar 112. Additionally, the data store 120 receives and stores monitoring data from the proxy 115. The monitoring data is associated with the corresponding panelist and/or client device via the port number used for the corresponding monitored Internet traffic. The data store 120 may also be capable of storing data that is not identifiers and/or measurement data. For example, software and/or firmware for any component of the monitoring system 100 may be stored in the data store 120. Additionally, the data store 120 may store demographic data as collected by the registrar 112.

The example proxy 115 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The proxy 115 of the illustrated example receives requests from the mobile device 105. The requests of the mobile device 105 are received by the proxy 115 based on configuration information (e.g., a server address, a port number, a username, a password, etc.) provided to the panelist and/or mobile device 105. The configuration information causes the mobile device 105 to transmit all subsequent requests through the proxy 115.

Upon receiving a request from the mobile device 105, the proxy 115 retrieves the requested Internet content from the Internet content providers 170 (or from a local cache if, for example, the content has previously been requested and stored). In order to identify the panelist associated with the request, communication to and from each specific panelist occurs over the uniquely assigned (e.g., dedicated) port. Thus, each panelist is assigned a unique port and no other panelist communicates via that port. In some examples, each panelist/device pair is assigned a unique port number to facilitate differentiation between usage of a first device (e.g., a phone) by a panelist and usage of a second device (e.g., an iPad) by the same panelist. While the communication between a mobile device 105 and the proxy 115 occurs over a single port, communication between the proxy 115 and the Internet content providers 170 may be implemented over any port. Typically, the port used by the proxy to communicate with content providers 170 is limited to hypertext transfer protocol (HTTP) data that occurs over port 80. After retrieving the requested Internet content from the Internet content provider(s) 170, in the illustrated example the content is relayed to the requesting mobile device 105 via the port assigned to the mobile device. Additionally or alternatively, the content may be relayed to the requesting mobile device 105 via a port other than the assigned port (e.g., port 80).

The proxy 115 of the illustrated example stores the requests for Internet content and/or portion(s) of such requests originating from the mobile device 105 in the data store 120 in association with the port numbers over which the request was received. Example data collected by the proxy 115 includes a username (e.g., proxy access credentials), an IP Address of the mobile device 105, a proxy port number for a request, a timestamp (e.g., a timestamp in a format such as: 2010-06-14 16:04:38-0400), a request method including a full requested URL and/or a query string, a status code of a response to the request, a size of a response to the request (e.g., a size of the payload, excluding headers), a User Agent, an X-DSID (e.g., a user id for iTunes or App Store on a iPhone), an X-Apple-Client-Application field value (e.g., "Software" for AppStore, "WiFi-Music" for iTunes), a referrer, a content type of a response to the request, a total size of a response to the request (e.g., a total size of the payload and HTTP headers), and/or time taken to serve the request (e.g., in microseconds). In storing the requests, the proxy 115 may additionally store other identifiers such as, for example, the identifier of the mobile device 105, and/or an identifier of the panelist. Additionally or alternatively, the proxy 115 may store a portion of the Internet content in the data store 120. For example, the proxy 115 may store the body of a webpage transmitted to the mobile device 105. In another example, the proxy 115 may store an identifier of an advertisement appearing on the webpage transmitted to the client. This is particularly useful in situations where advertisements are rotated at websites. Additionally or alternatively, the proxy 115 may store characteristics of the response, such as, for example the HTTP header, a status code of the HTTP header, a content type of the HTTP header, etc.

The Internet content providers 170 supply content to clients via the Internet. In the illustrated example, the proxy 115 acts as an intermediary for the mobile device 105, and, thus, is the client of the Internet content providers 170. Internet content is often supplied over port 80, as most Internet content is in the form of HTTP data. However, any other port may be used to supply Internet content. For example, file transfer protocol (FTP) data may be transmitted over port 21, HTTP over Secure Socket Layer (SSL) may be transmitted over port 443, etc.

The Internet content providers 170 may be any number and/or type of Internet provider. For example, the Internet content providers 170 may comprise a web server hosting webpages formatted as Hypertext Markup Language (HTML) content. Alternatively, the Internet content provider 170 may be an application server providing application content (e.g., media, audio, video, etc.) to applications accessing Internet content. The application content may be formatted as HTML, XML, or may use any other protocol or port to return content to the requester. In some examples, the application data is implemented in a protocol specifically targeted for an application (e.g., a weather application) requesting Internet content.

The example creditor 130 of the illustrated example of FIG. 1 credits application and/or browser usage to the panelist and/or mobile device based on the requests received by the proxy 115. In the illustrated example, the creditor 130 includes the example user identifier 135, the example device identifier 140, the example request filter 145, the example application identifier 150, and the example record searcher 155.

The example user identifier 135 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example user identifier 135 inspects requests (and/or records including requests) received by the proxy 115 to determine which user (e.g., panelist) transmitted the request. In the illustrated example, the example user identifier 135 identifies the panelist based on a port number via which the request is received. As shown in the example table 125 of FIG. 1, each panelist and device combination is associated with a unique port number. Accordingly, the panelist and device may be identified by the user identifier 135 based on the port number. However, any other approach to identifying a panelist may additionally or alternatively be used. For example, panelists may be identified based on user identifying information included in the received request (e.g., a username, a password, a cookie, etc.)

The example device identifier 140 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example device identifier 140 identifies a device that transmitted a request by performing a lookup of registration data and/or device data received from the panelist that is associated with the port number of the received request. However, any other method of identifying the device associated with the received request may additionally or alternatively be used. For example, the device identifier 140 may inspect the data in the user agent field of the received request to identify a device from which it was transmitted. In some examples, a user agent field of the received request contains information about the operating system version and/or a hardware version of the device transmitting a request. In some examples, identifiers present in the user agent field (e.g., version numbers) may be used to look up a device model in a lookup table. In some examples, the device identifier 140 identifies capabilities and/or features of the mobile device based on the lookup. For example, the device identifier 140 may identify that the mobile device includes, for example, a cellular radio, a sixteen gigabyte memory device, etc.

The example request filter 145 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example request filter 145 filters requests received by the proxy 115 and stored in the data store 120 based on one or more filters. The request filter 145 creates a filtered request log that is inspected by the example application identifier 150. In the illustrated example, the request filter 145 filters requests based on, for example, a port number of the received request, a user agent of the received request, a URL of the received request, a content type of the received request, an HTTP status message of the received request, an HTTP status code of a message returned to the proxy 115 by the Internet content providers 170, a parameter of an HTTP response received by the proxy 115 (e.g., a response to a request transmitted to the Internet content providers 170 on behalf of the mobile device 105), etc. In examples disclosed herein, the example request filter 145 filters requests and/or responses that are not related to crediting. As used herein, a record stored in the data store 120 may include a device identifier (410 of FIG. 4), a panelist identifier 420, a timestamp 430, request information 440, and any other information about the request. For example, the example request filter 145 may remove records that contain invalid information, data errors (e.g., messages including an HTTP status code indicating that there was an error in serving the response), duplicate records, etc. Additionally, the example request filter 145 tags requests relating to advertisement objects. In some prior systems, the tagged requests were included in a blacklist and discarded. However, in some disclosed examples, the tagged requests are included in a whitelist and used in accordance with the teachings of this disclosure.

The example application identifier 150 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example application identifier 150 identifies an application associated with the received request. In the illustrated example, the application identifier 150 identifies the application based on one or more of the user agent and/or the URL of the request. In some examples, the user agent may be generic and the URL may not identify a particular application. That is, the application may be difficult to identify. In such an example, the application identifier 150 may identify the application associated with the request based on other requests and/or records including requests that came from the same panelist/device and are within a threshold period of time of the difficult-to-identify request.

The example record searcher 155 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example record searcher 155 searches the data store 120 for two tagged requests within the whitelist that occur within a threshold time of each other. For example, if a first tagged request is made to the proxy 115, then the record searcher 155 will search the data store 120 to determine if a second request was made within a first threshold time of the first request. In this example, the first threshold is a time threshold, while in other examples the first threshold may include a particular number of requests that were made before and after the first request. Additionally, in this example, the second tagged request refers to a request made for an image and/or a video. However, in other examples, the second request may be any request made to the proxy. The record searcher 155 and the application identifier 150 analyze the first and second tagged requests to determine a parent advertiser of an advertisement which is described in further detail herein.

The example reporter 160 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The reporter 160 generates reports indicative of click-through rates based on one or more different types of mobile devices (e.g., personal computers, portable devices, mobile phones, tablets, etc.). For example, the reporter 160 compiles click-through rates based on parent advertiser crediting performed by the example creditor 130. is the reporter then generates a report to indicate click-through rate statistics. In some examples, the click-through rates provide ratings information for different advertisements.

Additionally or alternatively, the example reporter 160 may report click-through rates of different advertisements across different device types. Such different types of applications may be, for example, news applications, media applications (e.g., a streaming media application, an internet radio application, etc.), games, streaming games, email applications, productivity application (e.g., note taking applications, dictation applications, etc.), etc. The reporter may make such comparisons across any type(s) and/or numbers of devices including, for example, cell phones, smart phones, dedicated portable multimedia playback devices, iPod® devices, tablet computing devices (e.g., an iPad®), Internet enabled televisions, stationary computers, portable computers, Internet radios, etc. Any other type(s) and/or number of applications and/or devices may be analyzed. The report may also associate the click-through rates with demographic segments (e.g., age groups, genders, ethnicities, etc.) corresponding to the user(s) of the client device(s).

Figure 2:
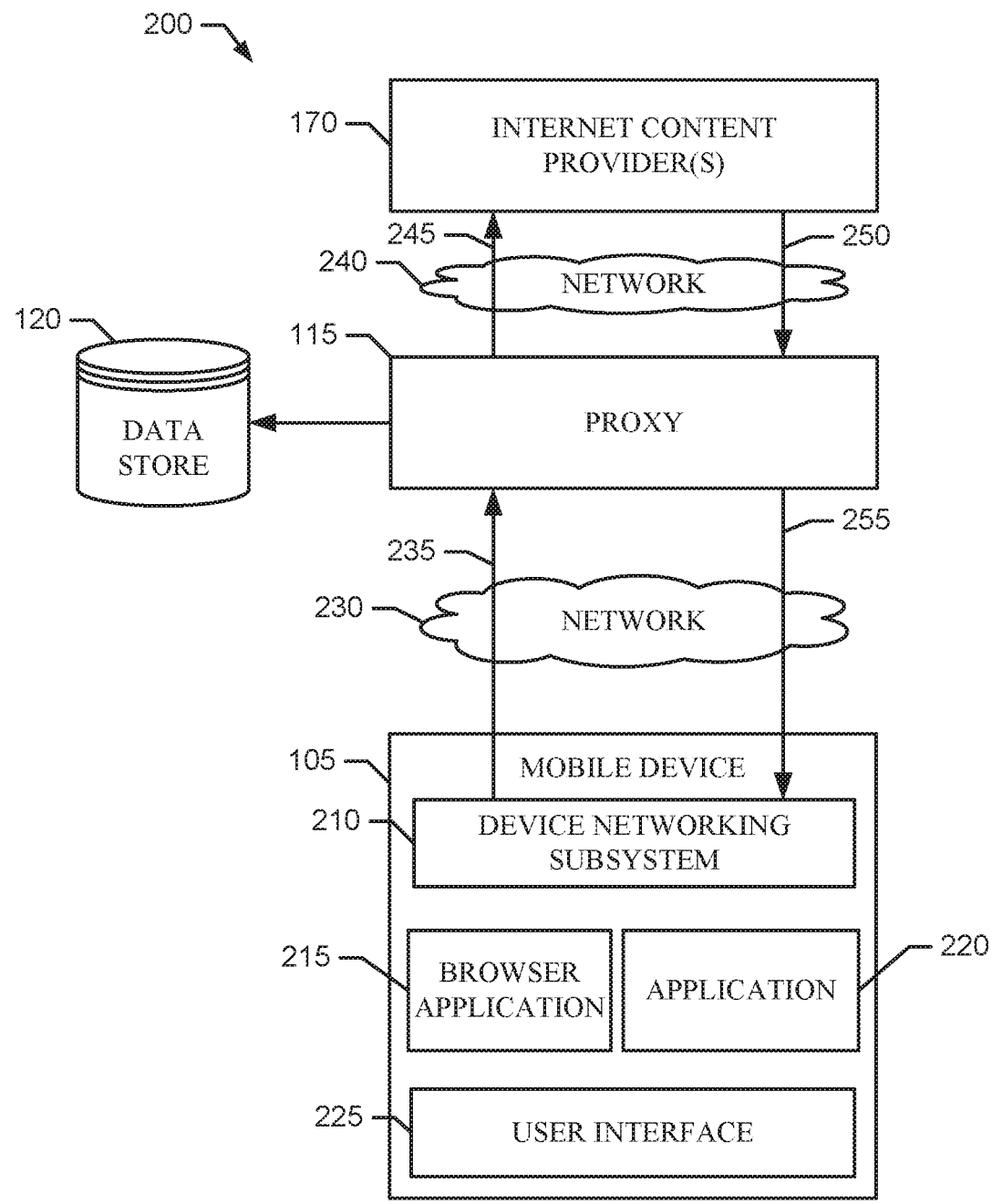
FIG. 2 is a block diagram illustrating an example request and response flow through the example system of FIG. 1.

FIG. 2 is a block diagram 200 illustrating an example request and response flow through the example system of FIG. 1. FIG. 2 includes the mobile device 105 of FIG. 1 which includes a networking subsystem 210, a browser application 215, an application accessing internet content 220, and a user interface 225. The block diagram 200 of FIG. 2 illustrates communication between the mobile device 105, a first network 230 with a first request 235, the proxy 115, the data store 120, a second network 240 with a second request 245, and the Internet content provider(s) 170. In the example of FIG. 2, the block diagram illustrates a first response 250 and a second response 255.

The networking subsystem 210 provides a framework for transmitting and receiving content. The networking subsystem 210 may be implemented via an application processor, a software system that facilitates networked communication, a browser engine, a baseband processor that transmits network traffic, and/or any other system that provides a framework for transmitting and receiving content. As used in this context, "content" encompasses material of interest to a user such as entertainment, news, etc. as well as information that may not be of interest to the user such as advertisements. In the illustrated example, the networking subsystem 210 is implemented by the networking libraries provided in the Apple® iPhone® operating system. However, any other libraries, systems, or programs may additionally or alternatively be used.

The browser application 215 and application accessing internet content 220 are applications that are executed by a processor of the mobile device 205. The browser application 215 requests Internet content from Internet content provider(s) 170, and renders the content for display. Additionally or alternatively, the browser application may request and render HTTP/HTTPS Internet content. In some examples, the browser application is implemented by Apple® Safari®. However, any other application may alternatively be used. For example, Pocket Internet Explorer may be used. In some examples, the Internet content is HTML content. However, the content may be presented in any format that may be rendered by the browser application 215.

The application accessing Internet content 220 may be any application on the mobile device that requests Internet content. For example, the application accessing Internet content 220 may be a weather application accessing Internet content provided by www.weather.com. The Internet content provider 170 providing content for www.weather.com may respond to content requests with HTML data. However, any other type of data may be contained in the content request. For example, the Internet content provider 170 providing content for www.weather.com may provide an XML file containing a condensed weather forecast. Additionally or alternatively, the application accessing Internet content 220 may request media such as, for example, photos, video, audio, etc. Typically, applications accessing Internet content 220 are limited to a small amount of information to be displayed. For example, the weather application may not be able to display sports news. Although the browser 215 or the application accessing Internet content 220 may initiate requests for content, in some devices, such as the Apple® iPhone®, requests are formatted and transmitted by the device networking subsystem 210 based on system wide settings that control routing and/or addressing of such requests (e.g., to a specific port of a proxy 115).

The user interface 225 of the illustrated example provides a display to the user and receives input from the user. The user interface 225 may comprise hardware, a graphics library, and/or a graphics driver for displaying content to the panelist, and may comprise hardware, an input library, and/or an input driver for receiving input from the panelist. Either or both the browser application 215 and/or the application accessing Internet content 220 may utilize the user interface to display content and receive input.

The first and second networks 230, 240 of the illustrated example of FIG. 2 are public networks (e.g., the Internet). However, a private network may instead be employed for one or more of the first and/or second networks 230, 240. For example, a network internal to an organization and/or company may be used to determine how members of the organization and/or employees of the company utilize mobile devices. In the illustrated example, the first and second networks 230, 240 are Internet Protocol (IP) version 4 (IPv4) based networks. However, any other networking technology may additionally or alternatively be implemented. For example, the networks 230, 240 may implement the IP version 6 (IPv6) protocol.

The proxy 115 of the illustrated example receives a first request 235 for Internet content from the mobile device 105, retrieves the content by sending a second request 245 to the corresponding internet content provider 170, receives the content in a response 250 from the internet content provider 170, and relays the content to the mobile device 105 via a second response 255. In the illustrated example, the proxy 115 stores characteristics and/or identifiers of the request and/or response in the data store 120. These characteristics and/or identifiers may be, for example, a timestamp of the request and/or response, an IP address of the mobile device, a user agent of the request, a status code of the response, a content type of the response, etc. However, the proxy 115 may additionally store the Internet content of the response in the data store 120.

The illustrated example shows a communication stream for a single request. The first request 235 is transmitted to the proxy 115 from the mobile device 105 over the carrier network 230. The first request 235 uses the unique port assigned to the mobile device 105 (e.g., port 50,000), and is for HTTP content (e.g., the request is for content that is served over port 80). However, the content requested may be requested over any port. For example, the request may be for file transfer protocol (FTP) content and may occur over port 21. The proxy 115, upon receiving the first request 235, stores some or all of the request in the data store 120, and generates a second request 245. The second request is addressed to the Internet content provider(s) 170 identified in the first request 235. The second request 245 in the illustrated example is transmitted via the second network 240 over port 80, because the first request 235 identified content to be served over port 80. The Internet content provider 170 responds to the second request 245 with the first response 250. The proxy 115 receives the first response 250 via port 80, stores some or all of the request in the data store 120, and forwards the content of the first response 250 as the second response 255 to the mobile device 105 over the port assigned to the mobile device 105.

Figure 3:
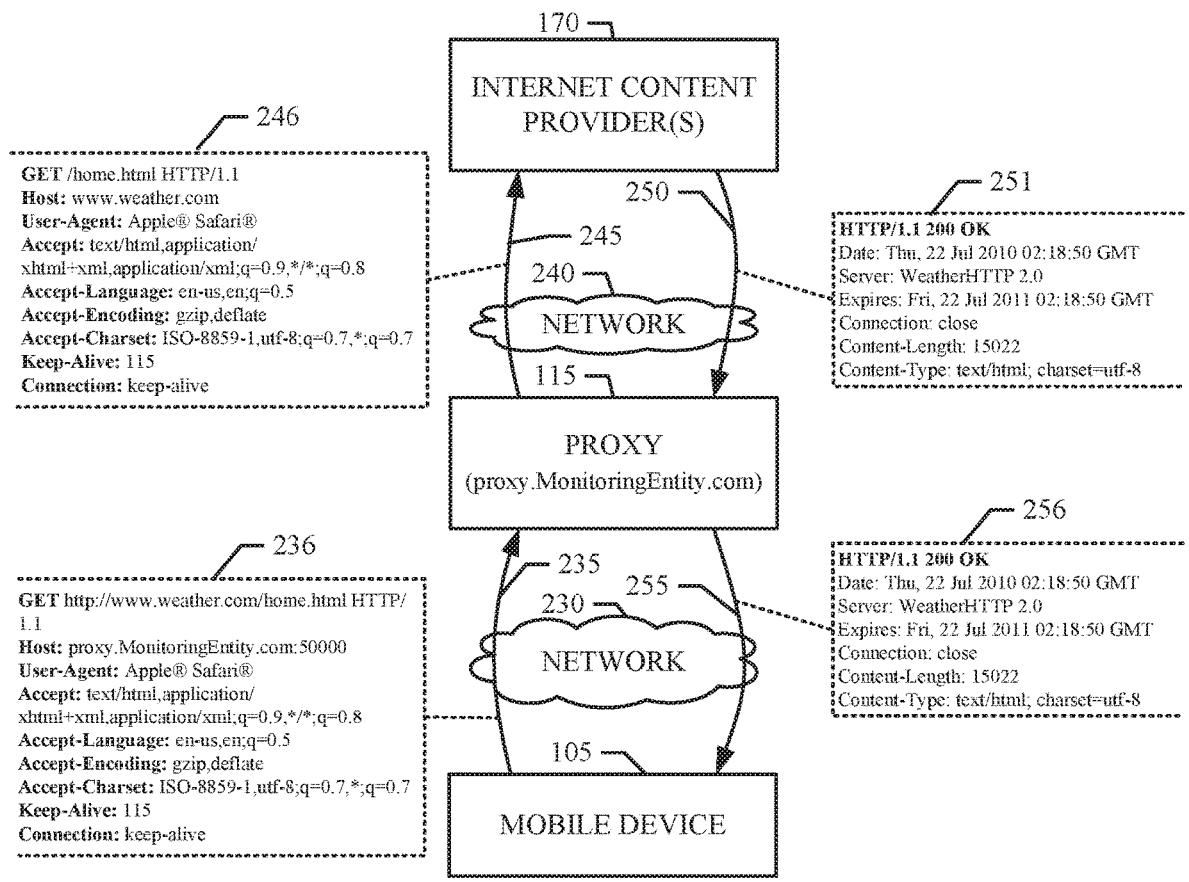
FIG. 3 is a block diagram illustrating an example request and response flow through the example system of FIG. 1.

FIG. 3 is a block diagram 201 illustrating an example request and response flow through the example system of FIG. 1. The block diagram 301 includes the proxy 115, the Internet content provider(s) 170, the mobile device 105, and the first and second networks 230, 240. The block diagram 201 additionally includes the first request 235, the second request 245, the first response 250, and the second response 255. Further, the requests and responses of the illustrated example are represented by HTTP request and response headers. The first request 235 is represented by the first HTTP request header 236 and the second request 245 is represented by the second HTTP request header 246. The first response 250 is represented by the first HTTP response header 251 and the second response 255 is represented by the second HTTP response header 256.

The first HTTP request header 236 is the header of a GET request generated by the mobile device 105. In the illustrated example, the Internet content provider 170 is identified by the absolute Universal Resource Locator (URL) identified in the first line of the first HTTP request header 236 and the address of the proxy 115 and uniquely assigned port are identified by the "Host" line of the first HTTP request header 236. The host identified in the illustrated example is proxy.MonitoringEntity.com, and the port that the request was made on is 50,000. However, any other address identifying the proxy 115, and any other port may alternatively be used. For example, the address identifying the proxy 115 may be the Internet Protocol (IP) address of the proxy 115. In the illustrated example, the absolute URL of the Internet resource is "http://www.weather.com/home.html". However, any other URL may additionally or alternatively be used.

The proxy 115 receives the first content request 235 and generates the second content request 245. The second content request 245 is represented by the second HTTP request header 246. In the illustrated example, the second HTTP request header 246 is a GET request directed to "http://www.weather.com", and is transmitted over port 80 as no port other than port 80 is identified in the header of the first content request 235. The content being requested from "http://www.weather.com" in the illustrated example is "/home.html". The proxy 115 generates the contents of the second request 245 by inspecting the first request 235. For example, the proxy 115 identifies the requested content of the first request 235 as "http://www.weather.com/home.html", determines that the port to be translated to is port 80 (identified by http://), determines that the Internet content provider 170 identified is "www.weather.com", and determines that the requested webpage from the Internet content provider is "/home.html". The second content request 245 is transmitted over port 80 because the proxy 115 determines that the requested content is HTTP content, and no alternative port number is specified.

In some examples, the content identified by a first content request may be content that is provided on a port other than port 80. For example, the mobile device 105 may seek to request content that is hosted on port 1234, rather than the default port (e.g., port 80). In that alternate example, an absolute URL of a first HTTP request header identifies the requested content as "http://www.weather.com:1234/home.html", to convey that the content identified by the request is provided on port 1234 (rather than the default port). Further, in such an example, the proxy 115 generates a second HTTP request header that identifies port 1234 (e.g., www.weather.com:1234).

The Internet content providers 170 receive the second content request 245, and respond to the request via the first response 250. The first response 250 is transmitted to the proxy 115. In the illustrated example, the first response is transmitted over port 80, as it is a response to a content request made on port 80. However, any other port may be used to transmit the first response to the proxy 115. The proxy 115 receives the first response 250, and determines the correct port that the second response 255 should be transmitted over. In the illustrated example, the proxy 115 determines the port that the second response should be transmitted over by associating the first response 250 with the first request 235 via the second request 245. In such an example, the proxy 115 can identify that the first request 235 originated on port 50,000, and thus, the second response should be transmitted on port 50,000. However, any other method of determining the port to transmit the second response over may additionally or alternatively be used. Further, the response may be transmitted over a port other than the port assigned to the mobile device 105.

FIG. 4 is an example data table of HTTP requests stored in the data store 120 by the proxy 115. The example data table 400 includes a device identifier column 410, a panelist identifier column 420, a timestamp column 430, and a request column 440. The ellipses (" . . . ") at the bottom of FIG. 4 indicates that the table contains a truncated version of the table for purposes of illustration. Moreover, in the illustrated example of FIG. 4, the example data table 400 includes data associated with a single device and a single panelist. However, in practice, the data table stored in the data store 120 by the proxy 115 will include data associated with any number of different devices and/or any number of panelists. Further, the example data table 400 illustrates an example time period of approximately eighteen minutes. However, in practice, the data table 400 stored in the data store 120 will include data associated with a longer time frame such as, for example, an hour, a day, a week, month, etc.

The example data table 400 of FIG. 4 includes a first row 450, a second row 460, a third row 470, a fourth row 480, and a fifth row 490. The example first row 450 of the illustrated example of FIG. 4 includes a record that identifies that an Apple iPhone associated with the panelist 50000 transmitted an HTTP request at 6:00:00 PM. The example second row 460 of the illustrated example of FIG. 4 includes a record that identifies that the Apple iPhone associated with the panelist 50000 transmitted an HTTP request at 6:01:23 PM. The example third row 470 of the illustrated example of FIG. 4 includes a record that identifies that the Apple iPhone associated with the panelist 50000 transmitted an HTTP request at 6:04:43 PM. The example fourth row 480 of the illustrated example of FIG. 4 includes a record that identifies that the Apple iPhone associated with the panelist 50000 transmitted an HTTP request at 6:15:39 PM. The example first, second, and fourth rows 450, 460, 480 include user agents identifying that the requests were associated with an ESPN application. The example HTTP requests of the example third row 470 includes a user agent identifying that the request was associated with an iPhone e-mail application. The example HTTP request of example fifth row 490 is associated with a Safari browser. However, the user agent(s) may associate their respective request(s) with any other application such as, for example, a YouTube application, a newsreader application, a browser application, etc. The example fifth row 490 of the illustrated example of FIG. 4 includes a record that indicates that the Apple iPhone associated with the panelist 50000 transmitted an HTTP request at 6:17:42 PM.

As disclosed herein, the example table 400 represents a filtered record log that may be processed by the example application identifier 150 and/or the example record searcher 155 to determine a parent advertiser of a requested advertisement.

While an example manner of implementing the example monitoring system 100 of FIG. 1 is illustrated in FIGS. 2-3, one or more of the elements, processes and/or devices illustrated in FIG. 2-3 may be combined, divided, re-arranged, omitted, eliminated and/or implemented in any other way. Further, the example registrar 112, the example proxy 115, the example data store 120, the example creditor 130, which in some examples, may include the example user identifier 135, the example device identifier 140, the example request filter 145 which, in some examples, may include the example port filter 146, the example user agent filter 147, and the example URL agent filter 148, the example application identifier 150, the example record searcher 155, the example reporter 160, and/or, more generally, the example monitoring system 100 of FIG. 1 may be implemented by hardware, software, firmware and/or any combination of hardware, software and/or firmware. Thus, for example, any of the example the example registrar 112, the example proxy 115, the example data store 120, the example creditor 130, which in some examples, may include the example user identifier 135, the example device identifier 140, the example request filter 145 which, in some examples, may include the example port filter 146, the example user agent filter 147, and the example URL agent filter 148, the example application identifier 150, the example record searcher 155, the example reporter 160, and/or, more generally, the example monitoring system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example registrar 112, the example proxy 115, the example data store 120, the example creditor 130, which in some examples, may include the example user identifier 135, the example device identifier 140, the example request filter 145 which, in some examples, may include the example port filter 146, the example user agent filter 147, and the example URL agent filter 148, the example application identifier 150, the example record searcher 155, the example reporter 160 is/are hereby expressly defined to include a tangible computer readable storage device or storage disk such as a memory, a digital versatile disk (DVD), a compact disk (CD), a Blu-ray disk, etc. storing the software and/or firmware. Further still, the example monitoring system 100 of FIG. 1 may include one or more elements, processes and/or devices in addition to, or instead of, those illustrated in FIGS. 2-3, and/or may include more than one of any or all of the illustrated elements, processes and devices.

Flowcharts representative of example machine readable instructions for implementing the example monitoring system 100 of FIG. 1 are shown in FIGS. 5-10. In these examples, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 5-10, many other methods of implementing the example monitoring system 100 may alternatively be used. For example, the order of execution of the blocks may be changed, and/or some of the blocks described may be changed, eliminated, or combined.

As mentioned above, the example processes of FIGS. 5-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
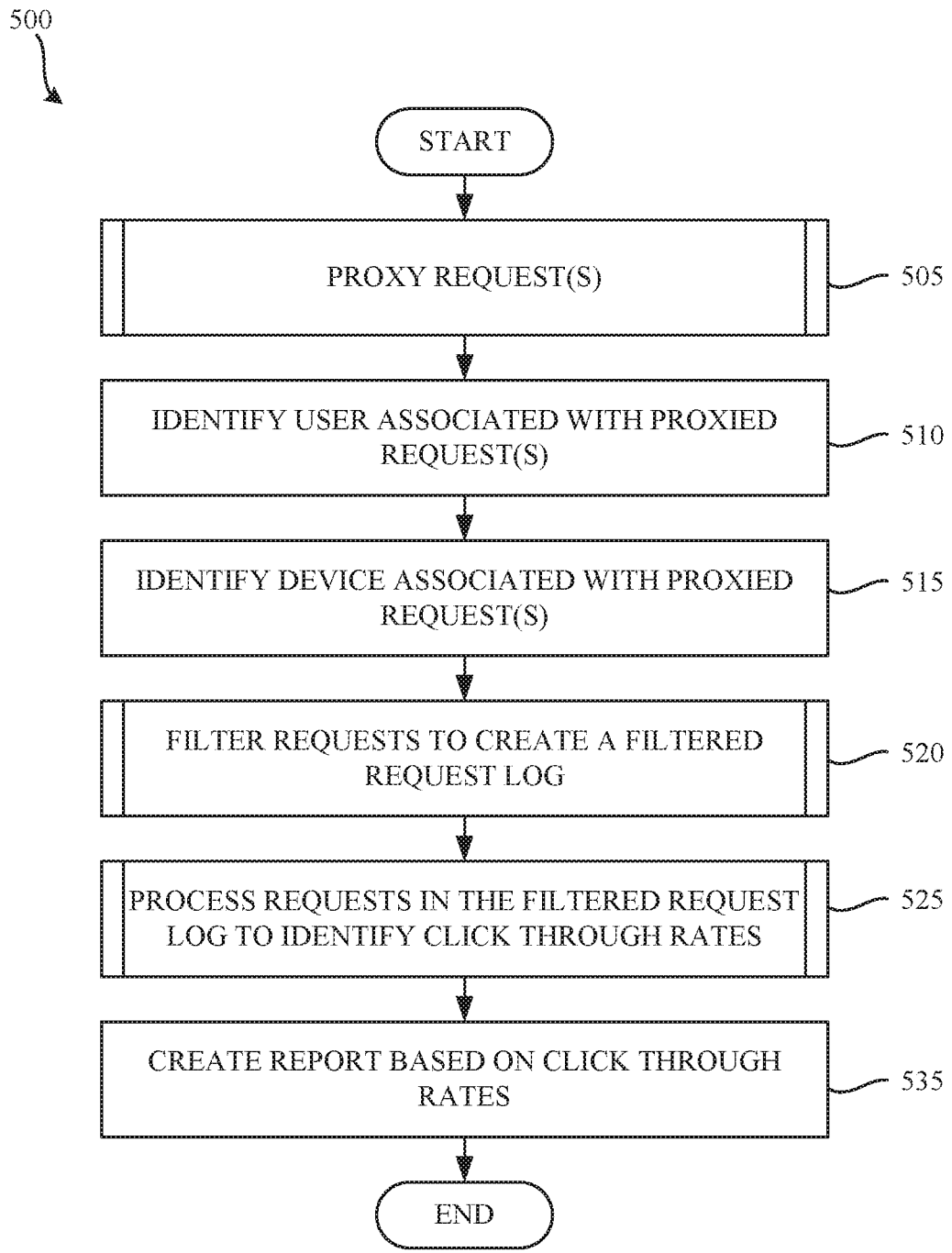
FIG. 5 is a flowchart representative of example machine-readable instructions that may be executed to implement the example monitoring system of FIG. 1.

FIG. 5 is a flowchart representative of example machine-readable instructions 500 that may be executed to implement the example monitoring system 100 of FIG. 1. The program 500 of FIG. 5 begins when the proxy 115 of FIG. 1 receives a request from the mobile device 105 (block 505). The proxy 115 proxies a request to Internet content providers 170, and stores a record of the request in the data store 120. An example procedure for proxying requests and storing data in the data store 120 is described in the illustrated example of FIG. 6. Once data is stored in the data store 120, the user identifier 135 of the illustrated example of FIG. 1 identifies a panelist associated with the proxy requests (block 510). In the illustrated example, the user identifier 135 identifies the panelists by performing a lookup in a panelist identifier table (e.g., the example table 125 of FIG. 1) based on, for example, a port number of the received request. In some examples, the user identifier 135 uses information other than the port identifier (e.g., a port number of the received HTTP request). For example, the example user identifier 135 identifies a panelist based on a username and/or password associated with the proxy request.

The device identifier 140 of the illustrated example of FIG. 1 identifies the device associated with the proxy request (block 515). In the illustrated example, the device identifier 140 identifies the device by performing a lookup of registration data and/or device data that is associated with the port number of the received request. However, any other method of identifying the device associated with the received request may additionally or alternatively be used. For example, the device identifier 140 may inspect the user agent of the received request to identify a device from which it was transmitted. In some examples, a user agent of the received request contains information about the operating system version and/or a hardware version of the device transmitting a request. In some examples, identifiers present in the user agent (e.g., version numbers) may be used to look up a device model in a lookup table. In some examples, the device identifier 140 identifies capabilities and/or features of the mobile device based on the lookup. For example, the device identifier 140 may identify that the mobile device includes, for example, a cellular radio, a sixteen gigabyte memory device, etc.

Despite having received device identifying information from the panelist (e.g., a device model such as, for example, an iPhone, an iPad, etc.), in some examples, it is beneficial to understand additional information about the device such as, for example, a model number, a size of available memory (e.g., eight gigabytes, sixteen gigabytes, etc.), an operating system version identifier, etc. Such information may be difficult to receive from a panelist and/or may be inaccurate if, for example, the panelist does not remember (or know) which operating system version identifier their mobile device is using. In some examples, not all requests transmitted by the mobile device 105 include such device identifying and/or feature identifying data (e.g., a model number, a size of available memory, etc.). However, some applications, such as "App Store" applications (e.g., apple iTunes, Google Play), transmit device and/or feature identifying data. App store applications typically transmit this information to ensure that a correct version of an application to be downloaded and/or installed on the mobile device is retrieved. For example, an application that operates on an iPhone may not operate correctly on an iPad, an application may require a minimum operating system version identifier. In some examples, the device identifying and/or feature identifying information may only be included when the HTTP request is transmitted by an "App Store" application of the mobile device. In such an example, panelists may be asked to periodically access the "App Store" application to trigger an HTTP request that conveys the device identifying information to the monitoring entity via the user agent. In some examples, the device identifier 140 responds to such an HTTP request by updating a table associating device information with a panelist. Such information may be useful for identifying which devices and/or versions of devices are in use by panelists.

The example request filter 145 of the illustrated example of FIG. 1 then filters the requests stored at block 505 to create a filtered request log (block 520). An example filtered request log is shown in FIG. 4. The filtered request log does not include HTTP requests that cannot be credited to an application and/or browser. An example method of filtering the stored requests is described below in the illustrated example of FIG. 7. In some examples, the example request filter 145 filters based on one or more properties of an HTTP response (e.g., a response to a request made by the mobile device 105 via the proxy 115). Response headers (e.g., an HTTP response header) and/or response bodies (e.g., an HTTP response body) may be analyzed to filter the requests. For example, a content type of a response may be used to filter an associated request, a response code (e.g., an HTTP status code) may be used to filter an associated request, etc.

In some examples, the example request filter 145 filters some of the received HTTP messages (e.g., HTTP requests and/or HTTP responses) when they are received by the proxy 115 to determine whether a record associated with the HTTP message should be stored in the data store 120. Filtering the messages when they are received reduces the amount of data that must be stored in the data store 120, as less HTTP messages may be stored when compared to storing all received HTTP messages. As an additional benefit, the amount of processing time required to post-process the stored records is reduced, as less records are later processed by the example request filter 145.

The example application identifier 150 of the illustrated example of FIG. 1 identifies an application that transmitted each request in the filtered request log (block 525). In examples disclosed herein, the application identifier 150 identifies the application associated with each request based on a user agent and/or a universal resource locator (URL). However, any other identifier may additionally or alternatively be used. An example method of identifying the application associated with a request is described in conjunction with FIG. 8. In some examples, identifying an application that transmitted the request is performed at the time that the request is received.

The record searcher 155 searches filtered requests in the data store 120 (block 525) based on the filtered and identified (e.g., application resolved) requests. In examples disclosed herein, the record searcher 155 identifies first and second requests to determine a parent advertiser of the first request and assigns a click-through event or a non-click-through event. An example method of determining click-through rates of an advertisement is described in conjunction with FIGS. 8-10.

Figure 12:
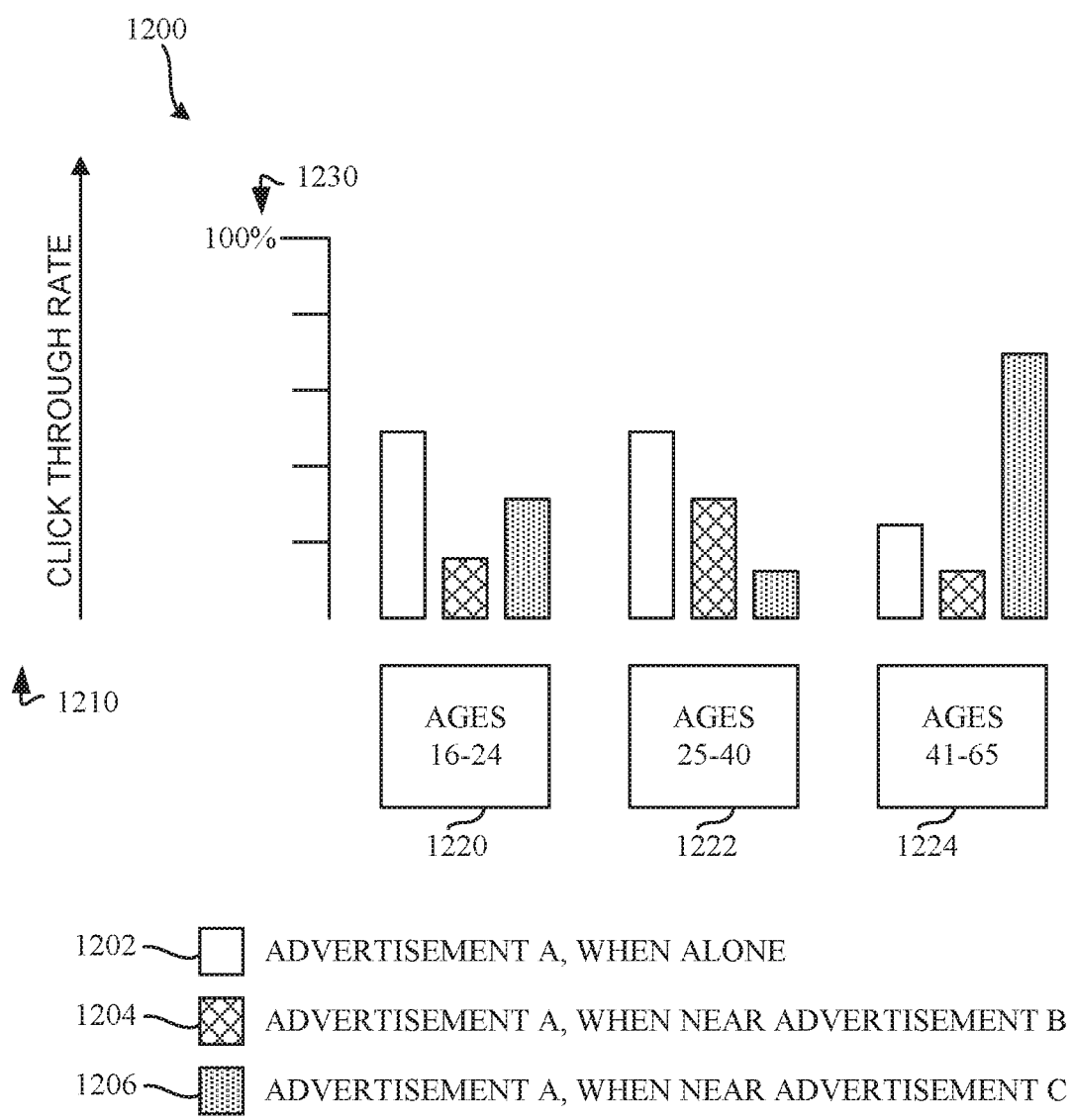
FIG. 12 illustrates an example report that may be created by the example reporter of FIG. 1 based on the information in the example report of FIG. 11.

The reporter 160 generates a report (block 535) based on the click-through data. In the illustrated example, the example report identifies click-through rates across different types of mobile devices and/or demographics of panelists. For example, the reporter 160 may generate a report indicating that a first user having a first demographic is more likely to click on a first advertisement than a second user having a second demographic. Example reports are shown in FIGS. 11 and 12.

Figure 6:
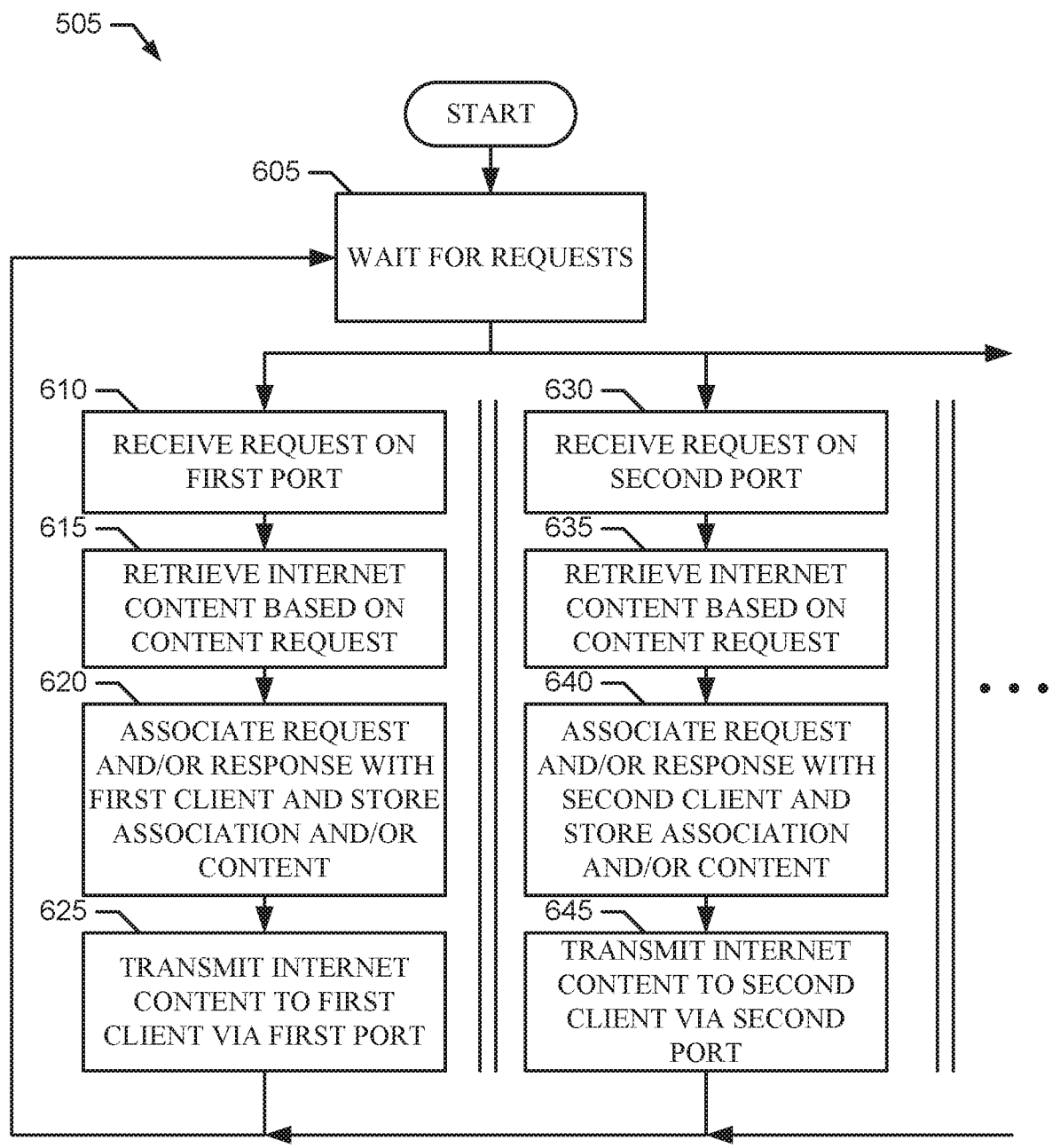
FIGS. 6-10 are flowcharts representative of example machine-readable instructions that may be executed to implement the creditor of FIG. 1.

FIG. 6 is a flowchart representative of example machine-readable instructions 600 that may be executed to implement the example proxy 115 of FIG. 1. The program of FIG. 6 illustrates an example implementation of block 505 of FIG. 5. The instructions 600 of FIG. 6 begins at block 605, where the example machine-readable instructions 600 begin execution. First, the proxy 115 waits for content requests (block 605). In the illustrated example, the proxy 115 waits for content requests only on ports assigned to a mobile device. However, the proxy 115 may wait for content requests on any or all ports. Additionally, the proxy 115 may inspect the Internet Protocol (IP) address against known range(s) of IP addresses to determine if the request should be serviced. For example, the known range of IP address may include ranges of IP addresses which are assigned to a particular Internet service provider and/or carrier. This may, for example, restrict use of the proxy 115 to mobile devices. If the proxy 115 determines that the request did not originate from an IP address within the particular Internet service provider, the proxy 115 may ignore the request. In some examples, the proxy 115 inspects a user agent of an incoming request to determine whether the request should be serviced. For example, if the user agent is associated with a desktop application (e.g., a desktop browser, etc.), the request may be blocked. Desktop applications do not reflect mobile device activity and, accordingly, should not be allowed to influence monitoring results associated with mobile device activity. In some examples, requests identified as having come from a device (rather than an application) that does not reflect mobile device activity (e.g., a request from a desktop computer, a request from an Internet enabled television, etc.) may be blocked.

Next, the proxy 115 receives a content request on a port. Because multiple requests for content may be received at substantially the same time, the proxy 115 may receive a first content request on a first port (block 610) and a second content request on a second port (block 630). In the illustrated example, the content requests are processed in parallel to decrease the amount of time taken to respond to requests. However, the content requests may be processed in any other manner. For example, the content requests may be processed serially. The parallel processing of any number of requests is represented in FIG. 6 by these dots " . . . ".

Next, the proxy 115 generates second request(s) based on corresponding ones of the request received at blocks 610 and 630, to retrieve the Internet content identified in the corresponding content requests (blocks 615 and 635). The proxy 115 also associates the content requests and/or responses with the corresponding requesting device and stores the association in the data store 120 (blocks 620 and 640). In the illustrated example, the proxy 115 associates the first content request with the corresponding mobile device using the port number that the request was received upon. In some examples, the proxy 115 associates the response to the request with the corresponding mobile device. The response may include information that may be useful for crediting purposes (e.g., an HTTP content types, an HTTP status code, an HTTP response body such as contents of a webpage, etc.) Since each port is used only by a single mobile device, each mobile device can be uniquely identified based on the port number of the port on which a request is received. Further, when storing the association in the data store 120, the proxy 115 may store one or more identifier(s) of the port, the client device, the panelist, etc. In some examples, the application that transmitted the request is identified and stored in the data store 120 at this point, rather than post-processing the received request(s). Additionally, the proxy 115 may store the returned content or a portion of the returned content in the data store 120 (block 620, 640).

The proxy 115 may filter what is stored in the data store 120. For example, the proxy 115 may only store content requests that request HTTP content, as requests for non-HTTP content may not be parsed properly when analyzing the information. As another example, the proxy 115 may omit style content (e.g., cascading style sheet (CSS) documents) from being stored in the data store 120, as style content may be of limited use when analyzing the information.

The proxy 115 finishes servicing the request from the client device by transmitting the requested Internet content to the client device via the port on which the content request was received (blocks 625 and 645). In some examples, the proxy 115 stores the body of the request. In some other examples, the proxy 115 stores the content of the response to the request. Control returns to the block 605, where the proxy 115 waits for more content requests (block 605).

Figure 7:
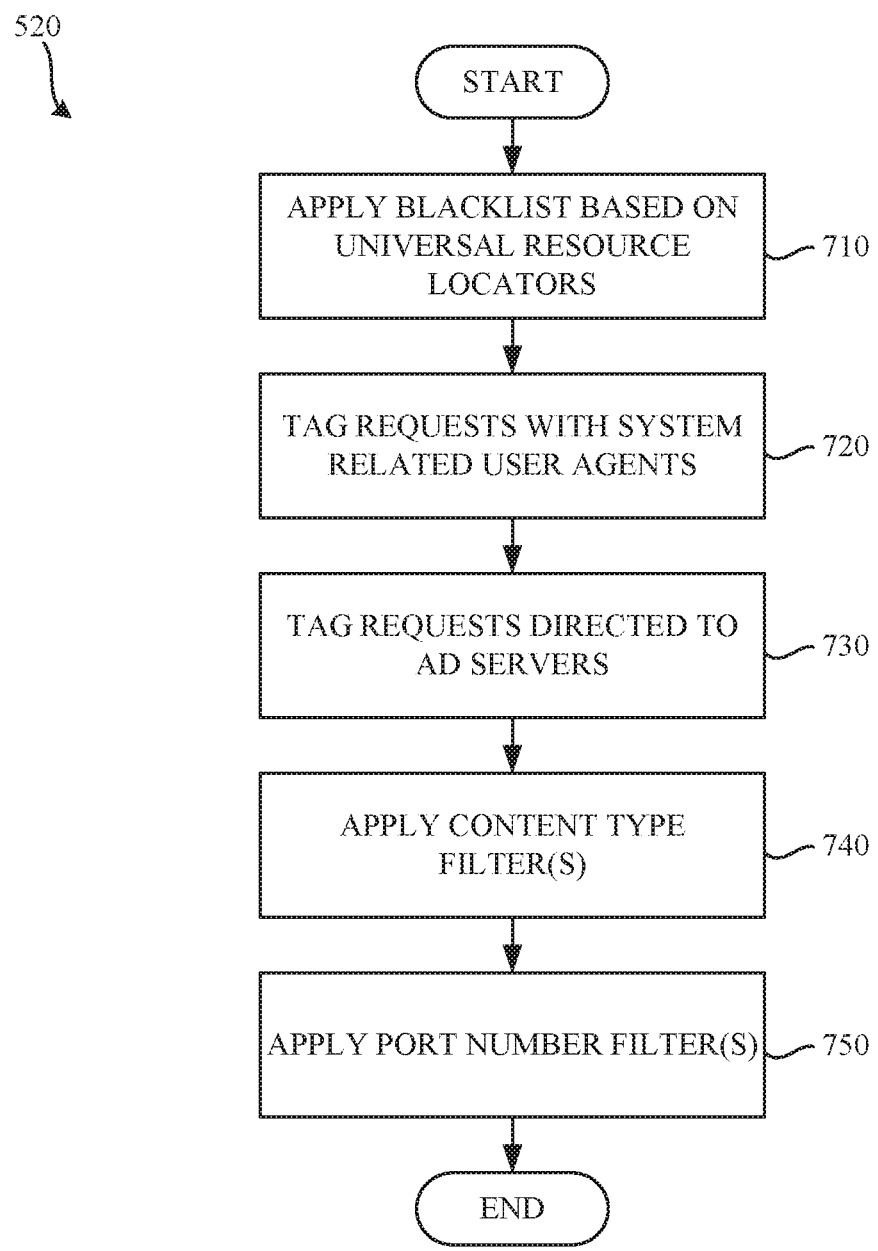

FIG. 7 is a flowchart representative of example machine-readable instructions 700 that may be executed to implement the example creditor 130 of FIG. 1. The program of FIG. 7 illustrates an example implementation of block 520 of FIG. 5. The process 700 of FIG. 7 begins when the request filter 145 filters requests stored in the data store. The example request filter 145 applies a blacklist based on universal resource locators (URLs) of the requests stored in the data store 120 (block 710). Some URLs are related to non-user initiated activities. Such URLs may include, for example, URLs associated with analytics, tracking, measurement robots, etc. In some examples, the request filter 145 only applies the URL filter when a particular user agent is used (e.g., a user agent associated with a browser such as, for example Safari). Applying such a two-part filter enables the request filter 145 to remove HTTP requests that are not associated with actual browsing and/or user activity. In some examples, the filtering happens on the fly such that these requests are not recorded and/or are deleted almost immediately after they occur. Some systems include a list (e.g., a whitelist, a blacklist, etc.) to flag events as advertisements. A list that was previously used as a blacklist to discard advertisement requests is used, in this example, as a whitelist to identify and/or store tagged advertisement requests in the data store 120.

The example request filter 145 tags requests with user agents related to mobile device system functionality (block 720). Some applications, such as, location applications, app store applications, email applications, newsreader applications, etc. transmit requests for content automatically (e.g., without user instruction). That is, as a result of the requests with user agents related to mobile device system functionality, no visual indicators are shown on the mobile device display. For example, an e-mail application may send a request to an e-mail server to determine whether any new messages are present and/or are to be downloaded. Such a request from an e-mail application may occur periodically and/or a-periodically and is not necessarily performed as a result of user interaction with the mobile device.

The example request filter 145 tags requests directed to advertisement servers (block 730). In the illustrated example, advertisement servers are identified based on a known list of advertising servers. The list may periodically and/or a-periodically be updated to identify newly identified advertisement and/or advertising servers. Advertising traffic primarily occurs when using a browser (e.g., to view a website that includes an advertisement). In the illustrated example, browser records (e.g., HTTP requests that can be identified as being associated with a browser such as, for example, Safari) are tagged as related to advertisement server activity when they are directed to an advertisement server. For example, browser records may be tagged as advertisement server activity based on identification of URLs directed to application advertisement servers. In some prior systems, the records that were tagged as advertisement server activity were flagged by a blacklist and discarded. However, in the illustrated example, the records tagged as advertisement server activity are not blacklisted and, instead, are included in advertisement server traffic reporting (e.g., the records are whitelisted). However, according to the illustrated example, records tagged as directed to tracking scripts, bots, and/or analytics scripts are still blacklisted and are not considered when determining click-through rates of an advertisement as they do not represent user activity. Whitelisted records (e.g., records tagged as related to advertisement server activity) may be used to credit applications and/or other media and determine the click-through rate of advertisements on the application and/or other media.

The example request filter 145 applies a content type filter to remove records having particular content types (block 740). In some examples, the content type filter may be used as a whitelist for media associated with advertisements (e.g., records including images, video, text, etc. may be whitelisted and used for further analysis). As described above, advertisement and/or tracking requests (see Blumenau, U.S. Pat. No. 6,108,637, which is hereby incorporated by reference in its entirety) are commonly sent when applications are running. In some examples, the advertisement and/or tracking requests are the only type(s) of requests that applications transmit. For example, a game application that does not request information from a network resource as part of the gameplay functionality may include advertisements (e.g., at the top and/or bottom of the screen). Such advertisements may be requested and categorized as advertisement traffic based on, for example, a URL to which they were directed. While it may not be possible to identify applications based on the advertising traffic (because, in some examples, the advertising traffic is generic to multiple applications), knowing that the advertising traffic occurred factors into how other applications are identified because, for example, it is known that a game application was used while another application was not. In some examples, the advertising traffic uses particular content types that must be included in the results for determining the click-through rate of a particular advertisement on a particular application.

The example request filter 145 applies a port number filter to remove records having particular port numbers (block 750). As described above, panelists are each assigned a unique port number to use when sending requests. The example request filter 145 applies a port number filter to remove records that are not associated with a panelist. In the illustrated example, the port number filter is a whitelist including port numbers that are associated with respective panelists. For example, if no panelist is associated with port 12345, requests received port 12345 may be removed from the request log. In some examples, the filter is implemented as a blacklist, in that requests made via ports that are not related to panelist traffic are removed. For example, the example request filter 145 may remove communications that were received via port 80. Port 80 is associated with the HTTP protocol and is not assigned to a panelist. In some examples, when the mobile device 105 requests proxy configuration details (e.g., prior to when the mobile device is configured to transmit requests via the proxy 115), such requests are made via port 80. Because requests for configuration information do not represent user activity they can be ignored and/or removed by the request filter 145.

While in the illustrated example of FIG. 7 the example request filter 145 applies a number of different filters (e.g., a port filter 146, a user agent filter 147, a URL filter 148, etc.), any other number and/or types of filters may additionally or alternatively be used such as, for example, a filter based on HTTP status messages, a filter based on a HTTP method (e.g., get, post, etc.), etc.

Figure 8:
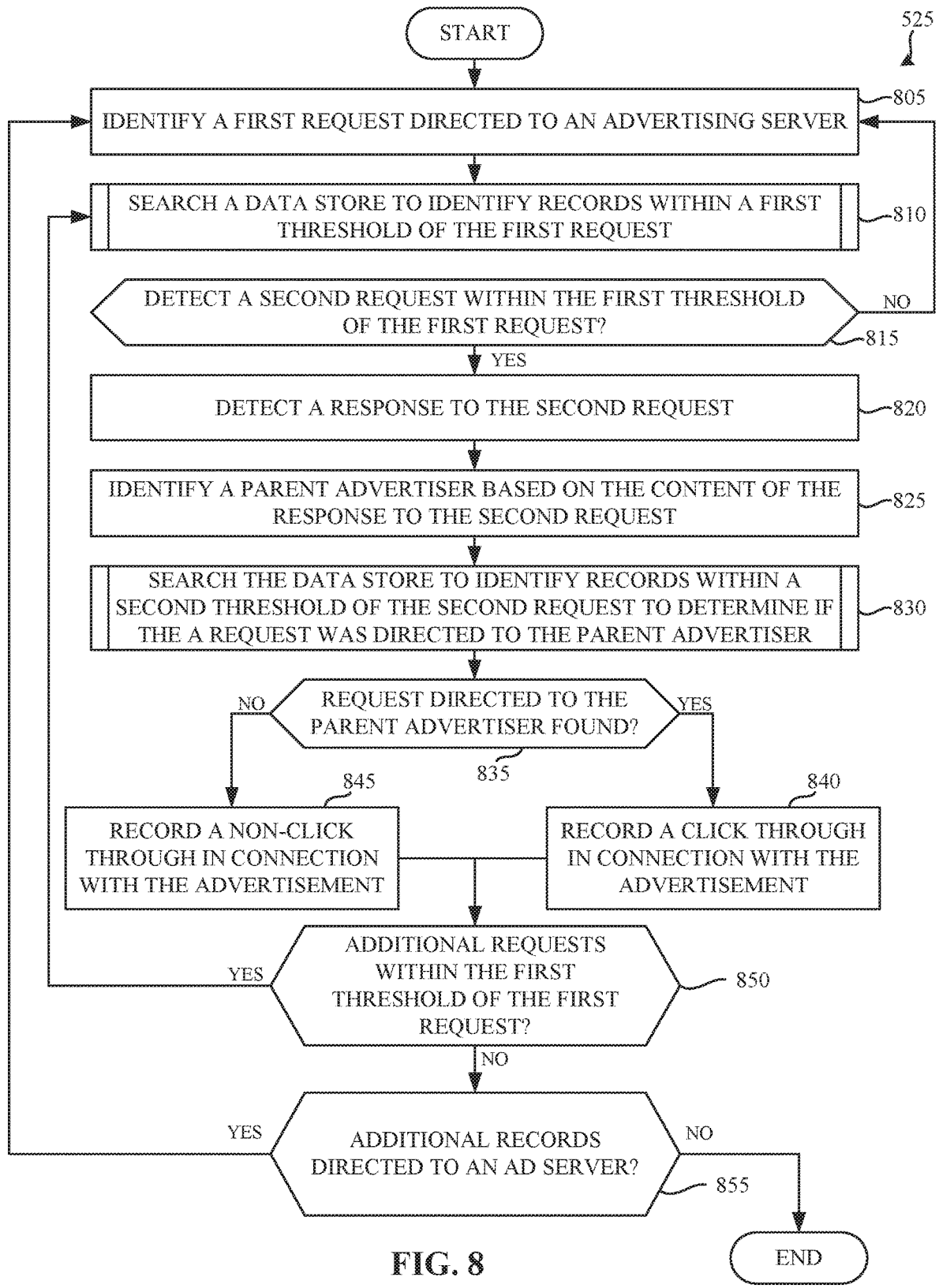

FIG. 8 is a flowchart representative of example machine readable instructions 800 that may be executed to implement the example creditor 130 of FIG. 1. The program of FIG. 8 illustrates an example implementation of block 525 of FIG. 5. The application identifier 150 identifies a first request directed to an advertising server (block 805). In the illustrated example, the application identifier 150 inspects the requests stored in the filtered request log (e.g., in the data store 120). In the illustrated example, the application identifier 150 identifies the first request directed to an advertising server only on ports assigned to a mobile device. However, the application identifier 150 may identify a first request on any or all ports.

Next, the record searcher 155 searches the data store 120 to identify records within a first threshold of the first request (block 810). In the illustrated example, the first threshold of the first request is a time threshold of ±five minutes. However, in other examples, the first threshold of the first request may be any time threshold. Additionally, in further examples, the first threshold of the first request may be any threshold. For example, the first threshold of the first request may include a particular number of requests made before and after the first request regardless of the amount of time between the requests. The process of searching the data store 120 to identify records within the first threshold of the first request is described in further detail in conjunction with FIG. 9.

Next, the request identifier 150 attempts to detect a second request within the first threshold of the first request (block 815). In the illustrated example, the second request includes a request for an image or video. However, in other examples, the second request may be any type of request made to the proxy 115. In this example, the application identifier 150 only identifies the first request on ports assigned to a mobile device. Therefore, the application identifier 150 will only detect the second request on ports assigned to a mobile device. However, in other examples, the application identifier 150 may detect the second request on any or all ports (e.g., if the first request is identified on any or all ports). If the application identifier 150 does not detect a second request within the first threshold of the first request, then control returns to block 805 to identify a first request directed to an advertising server. If the application identifier 150 detects a second request within the first threshold of the first request, then the application identifier 150 detects a response to the second request (block 820). For example, a response will pass through the proxy following the request. In this example, the source of the response will match the destination of the request.

In response to detecting a response to the second request, the application identifier 150 identifies a parent advertiser based on the content of the response to the second request (block 825). For example, a person and/or computer may analyze the content of the response to determine the parent advertiser (e.g., may compare the image and/or video against a reference library). In some examples, the parent advertiser is identified using an automated image classification system and reference libraries such as the example classification system described in U.S. Pat. No. 8,433,142, which is hereby incorporated by reference in its entirety. The response may include HTTP content types, an HTTP code, an HTTP response body such as contents of a webpage, etc. In some examples, the image or video (e.g., second request) associated with an advertisement does not always originate from the same source as the parent advertiser. Therefore, to identify the parent advertiser, the application identifier 150 analyzes the content of the response to the second request instead of the origination of the second request. For example, if an advertisement for yahoo.com includes an image and/or video, the image and/or video may be provided by a third party data provider. Therefore, the application identifier 150 must analyze the response to the second request to determine that the parent advertiser is yahoo.com.

In response to the application identifier 150 identifying the parent advertiser, the record searcher 155 searches the data store 120 to identify records within a second threshold of the second request to determine if a request was directed to the parent advertiser (block 830). For example, after the parent advertiser is determined to be yahoo.com, the record searcher 155 searches the data store 120 to determine if any requests were made to yahoo.com. In the illustrated example, the second threshold of the second request is a time threshold different than the first threshold of the first request. However, in other examples, the second threshold of the second request may be any threshold or may be identical to the first threshold of the first request. If the record searcher 155 determines there is a request directed to the parent advertiser within the second threshold of the second request (block 835), then the reporter 160 records a click-through event in connection with the advertisement (block 840). However, if the record searcher 155 determines there is not a request directed to the parent advertiser within the second threshold of the second request, then the reporter 160 records a non-click-through event in connection with the advertisement (block 845).

Next, the record searcher 155 determines if there are additional requests within the first threshold of the first request (block 850). If the record searcher 155 identifies additional requests within the first threshold of the first request, control returns to block 810 to search the data store to identify records within the first threshold of the first request. If the record searcher 155 does not identify additional requests within the first threshold of the first request, the application identifier 150 determines if there are additional records directed to an advertising server (block 855). If the application identifier 150 determines that there are additional records directed to an advertising server, control returns to block 805 to identify a first request directed to an advertising server. However, if the application identifier 150 determines that there are no additional records directed to an advertising server, then the program ends.

Figure 9:
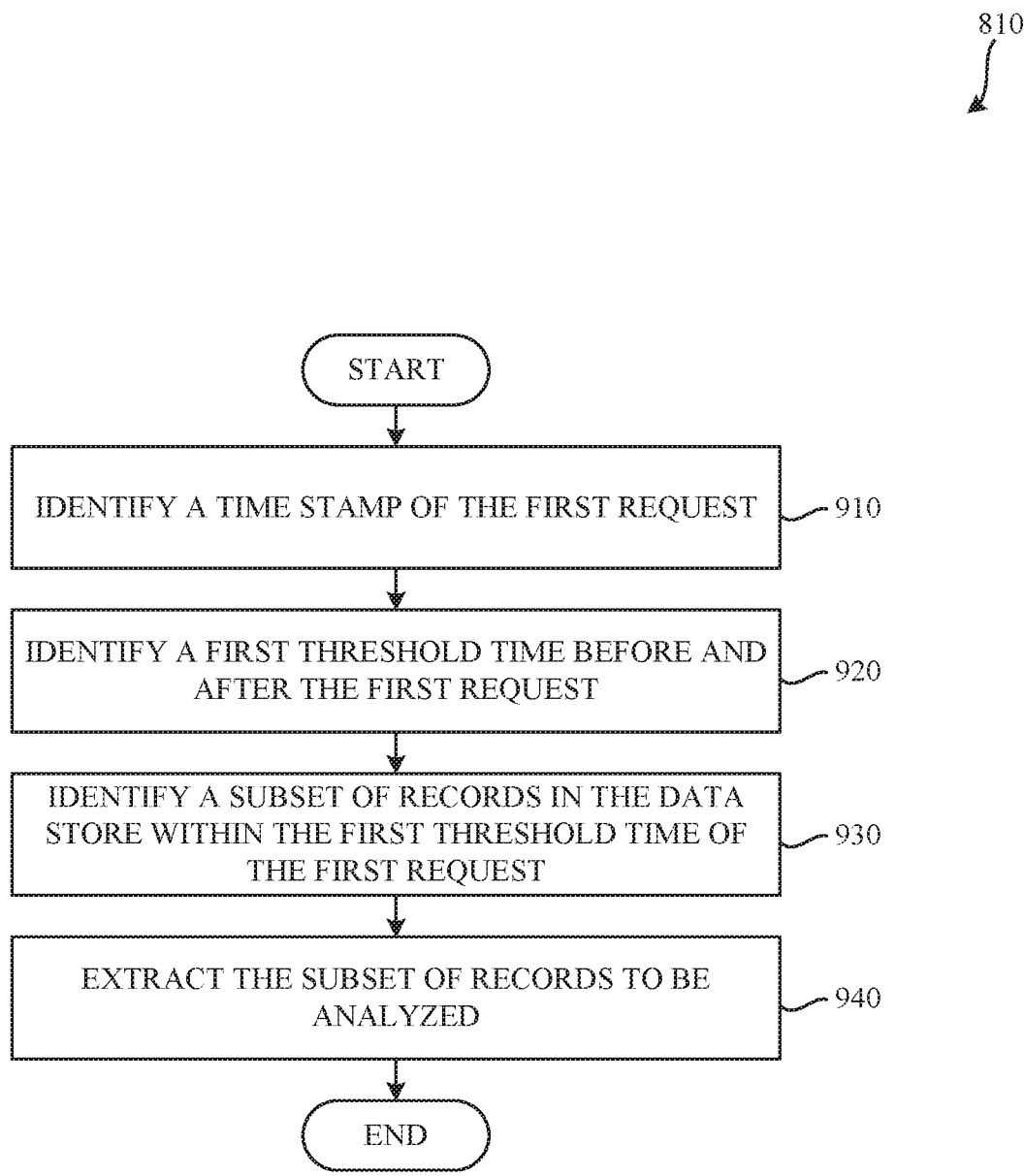

Turning to FIG. 9, the example process 900 illustrates an example implementation of block 810 of FIG. 8. The process 900 of FIG. 9 begins at block 910, where the record searcher 155 identifies a time stamp of the first request. As illustrated in the example table 400 of FIG. 4, the data store 120 stores each request stored in the data store 120 includes a corresponding time stamp.

The record searcher 155 then identifies a first threshold time before and after the first request (block 920). In this example, the first threshold is a threshold time that is determined and adjusted by a user. In some examples, the first threshold time before the first request may be different than the first threshold time after the first request. In this example, the first threshold of the first request is a threshold time. However, in other examples, the first threshold may be another type of threshold such as a particular number of records before and after the request regardless of the amount of time between the requests.

After the record searcher 155 identifies a first threshold time, the record searcher 155 identifies a subset of records in the data store 120 within the first threshold time of the first request (block 930) and extracts the subset of records to be analyzed (block 940). In the illustrated example, the number of records in the subset of records within first threshold of the first request is fewer than the number of records in the data store 120. In some examples, to find the subset of records, the record searcher 155 only considers records within the extracted subset of records within the first threshold of the first request. However, in other examples, the record searcher 155 may scan each record in the data store 120 to determine if the record is within the first threshold of the first request.

Figure 10:
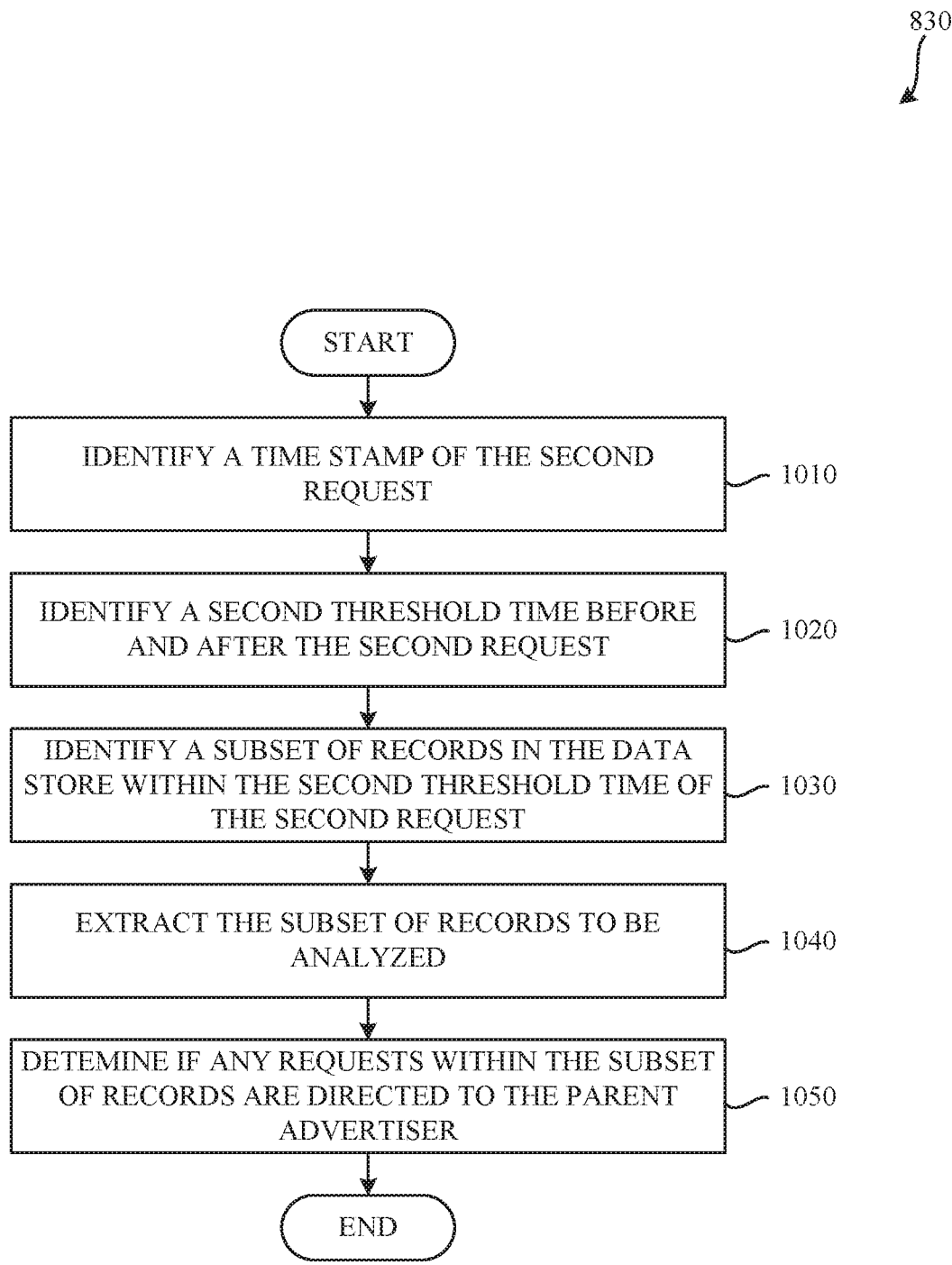

Turning to FIG. 10, the example process 1000 illustrates an example implementation of block 830 of FIG. 8. The process 1000 of FIG. 10 begins at block 1010, when the example record searcher 155 identifies a time stamp of the second request The record searcher 155 then identifies a second threshold time before and after the second request (block 1020). In this example, the second threshold is a threshold time that is determined and adjusted by a user. In some examples, the second threshold time before the second request may be different than the second threshold time after the second request. In this example, the second threshold of the second request is a threshold time. However, in other examples, the second threshold may be another type of threshold such as a particular number of records before and after the request regardless of the amount of time between the requests. After the second threshold time is determined, the record searcher 155 identifies a subset of records in the data store 120 within the second threshold time of the second request (block 1030) and extracts the subset of records to be analyzed (block 1040). In the illustrated example, the number of records in the subset of records within the second request is fewer than the number of records in the data store 120. In some examples, to find the subset of records, the record searcher only considers records within the extracted subset of records within the second threshold of the second request. However, in other examples, the record searcher 155 may scan each record in the data store 120 to determine if the record is within the second threshold of the second request. Once the subset of records is extracted, the record searcher 155 determines if any requests within the subset are directed to the parent advertiser (block 1050). The record searcher 155 analyzes each request within the subset of records and if the request matches the parent advertiser from block 825 of FIG. 8, then the record searcher 155 determines that the request was made to the parent advertiser.

FIG. 11 illustrates an example report 1100 that may be created by the example reporter 160 of FIG. 1. The example report 1100 includes a panelist identifier column 1110, an advertisement identifier column 1120, a click-through/non-click-through column 1130, and a nearby advertisement identifier column 1140. The ellipses (" . . . ") at the bottom of FIG. 11 indicates that the report 1100 contains a truncated version of the table for purposes of illustration. Moreover, in the illustrated example of FIG. 11, the example report 1100 includes data associated with a single device and a single panelist. However, in practice, the data table reported by the reporter 160 will include data associated with any number of different devices and/or any number of panelists.

The example report 1100 of FIG. 11 includes a first row 1150, a second row 1160, a third row 1170, a fourth row 1180, and a fifth row 1190. The example first row 1150 of the illustrated example of FIG. 11 includes a record that identifies that a panelist 50000 clicked on and viewed an advertisement A while the advertisement A was not within a third threshold of any other advertisements on a displayed webpage. In this example, the third threshold refers to a time between at least two advertisements loading on a displayed webpage (e.g., ±5 seconds, ±7 seconds, etc.). The example second row 1160 of the illustrated example of FIG. 11 includes a record that identifies that the panelist 50000 clicked on and viewed the advertisement A while the advertisement A was within the third threshold of a different advertisement B on a displayed webpage. The example third row 1170 of the illustrated example of FIG. 11 includes a record that identifies that the panelist 50000 opted to not click on and view the advertisement A while the advertisement A was within the third threshold of the advertisement B and a different advertisement C on a displayed webpage. The example fourth row 1180 of the illustrated example of FIG. 11 includes a record that identifies that the panelist 50000 clicked on and viewed the advertisement A while the advertisement A was within the third threshold of the advertisement C on a displayed webpage. The example fifth row 1190 of the illustrated example of FIG. 11 includes a record that identifies that the panelist 50000 opted to not click on and view the advertisement B while advertisement B was within the third threshold of advertisement A on a displayed webpage.

FIG. 12 illustrates an example report 1200 that may be created by the example reporter 160 of FIG. 1 using the information from the example report 1100 of FIG. 11. The example report 1200 illustrates advertisement statistics when placed within the third threshold of other advertisements across age demographics. In the illustrated example, the report 1200 shows the click-through statistics of advertisement A, when alone 1202 (the first row 1150 of FIG. 11), the click-through statistics of advertisement A, when near (e.g., within the third threshold of) advertisement B 1204 (the second row 1160 of FIG. 11), and the click-through statistics of advertisement A, when near advertisement C 1206 (the fourth row 1180 of FIG. 11). The illustrated example report 1200 further shows the click-through rate 1210 of users ages sixteen through twenty four 1220, users ages twenty five through forty 1222, and users ages forty one through sixty five 1224. While in the illustrated example, the example report 1200 is based on age demographics, any other factors may additionally or alternatively be used such as, for example, race, geographic location, income, etc. In the illustrated example, the example report 1200 shows average click-through rates over a period of one day. That is, click-through rates of individual users for a single advertisement on a given day are averaged and outputted onto the example report 1200 by the reporter 160. However, in other examples, the report 1200 may show average click-through rates over a period of an hour, a month, a year, or any other time period.

Figure 13:
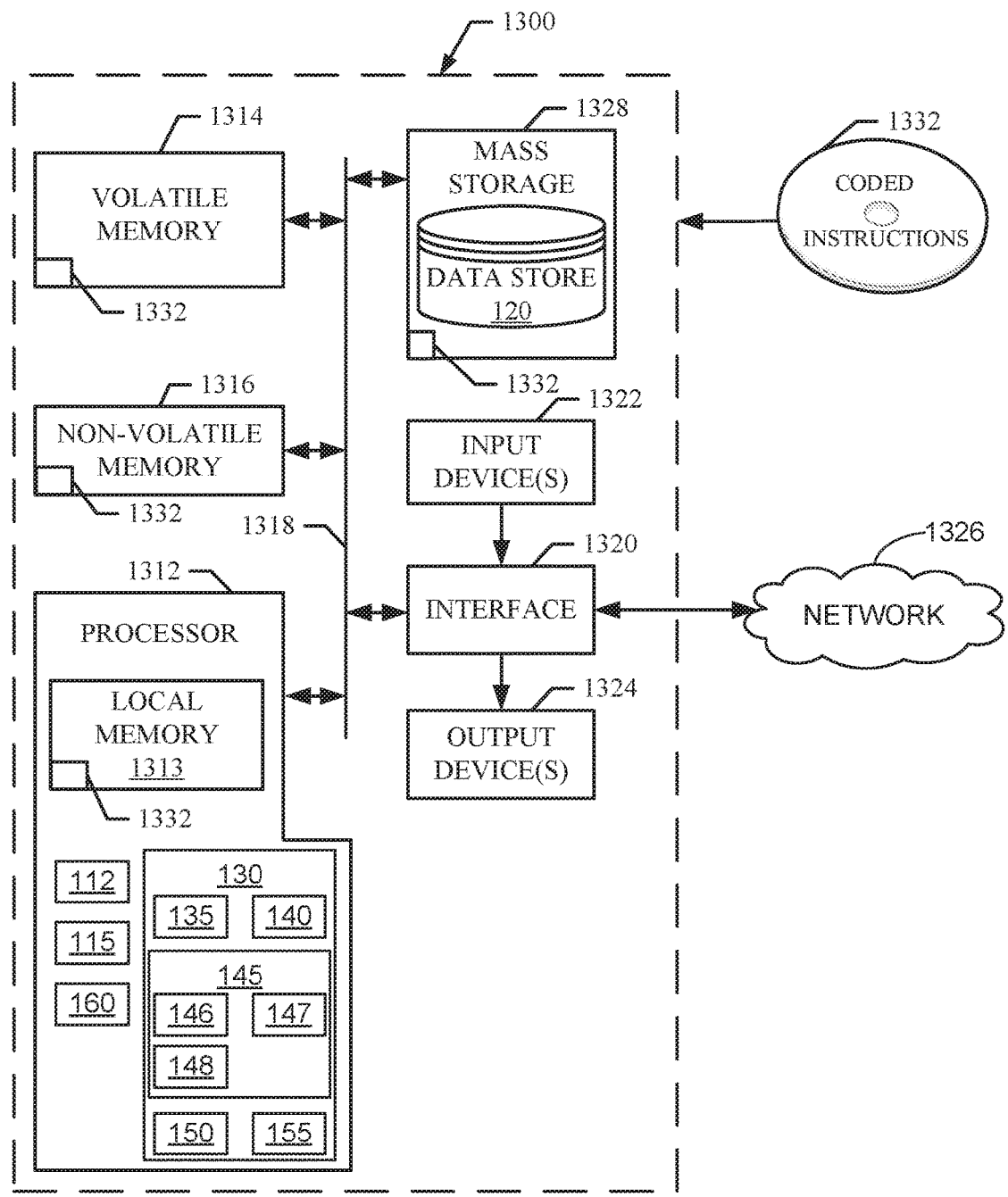
FIG. 13 is a block diagram of an example processor platform capable of executing the instructions of FIGS. 5, 6, 7, 8, 9 and/or 10 to implement the example monitoring system of FIG. 1.

FIG. 13 is a block diagram of an example processor platform 1300 capable of executing the instructions of FIGS. 5-10 to implement the system 100 of FIG. 1. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In this example, the processor 1312 implements the example registrar 112, the example proxy 115, the example creditor 130, the example user identifier 135, the example device identifier 140, the example request filter 145, the example port filter 146, the example user agent filter 147, the example URL filter 148, the example application identifier 150, the example record searcher 155, and the example reporter 160.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. In this example, the mass storage device(s) 1328 inplements the data store 120.

The coded instructions 1332 of FIGS. 5-10 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture allow audience measurement entities to use advertisement request information that was previously blacklisted and discarded. The advertisement request information is used to measure and analyze advertisement click-through rates using proxy log data. Audience measurement entities are also able to measure the click-through rates of advertisements when placed within from other advertisements on a displayed webpage.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to determine advertisement click-through rates, the apparatus comprising:
    an application identifier to identify a first computing application associated with a first network communication protocol request received at a proxy server for Internet communications;
    a record searcher to search records in a data store storing requests received at the proxy server within a first threshold of the first network communication protocol request to detect a second network communication protocol request;
    a response detector to detect a response to the second network communication protocol request;
    wherein the application identifier is further to identify a parent advertiser based on content of the response to the second network communication protocol request;
    wherein the record searcher is further to search the data store to identify records within a second threshold of the second network communication protocol request to determine if the second network communication protocol request is directed to the parent advertiser; and
    a reporter to record a click-through event or a non-click-through event as a result of the searching, wherein at least one of the application identifier, the record searcher, the response detector, and the reporter are implemented by a logic circuit.

2. The apparatus as described in claim 1, further including a request filter to filter requests received by the proxy server to prevent filtered requests from being processed by the application identifier and the record searcher.

3. The apparatus as described in claim 1, further including a user identifier to identify a user associated with the first network communication protocol request.

4. The apparatus as described in claim 1, further including a device identifier to identify a device associated with the first network communication protocol request.

5. A method for determining advertisement click-through rates, the method comprising:
- identifying, by executing an instruction with a processor, a first network communication protocol request received at a proxy server for Internet communications, the first network communication protocol request directed to a first advertising server;
- searching, by executing an instruction with the processor, a data store storing requests received at the proxy server to identify records within a first threshold of the first network communication protocol request to detect a second network communication protocol request;
- detecting, by executing an instruction with the processor, a response to the second network communication protocol request;
- identifying, by executing an instruction with the processor, a parent advertiser based on content of the response to the second network communication protocol request;
- in response to identifying a parent advertiser, searching, by executing an instruction with the processor, the data store to identify records within a second threshold of the second network communication protocol request to determine if the second network communication protocol request was directed to the parent advertiser; and
- recording, by executing an instruction with the processor, a click-through event or a non-click-through event, as a result of the searching.

6. The method as described in claim 5, wherein a number of records within the first threshold of the first network communication protocol request is fewer than a number of records in the data store.

7. The method as described in claim 5, wherein the second network communication protocol request is an image or a video.

8. The method as described in claim 5, wherein the threshold of the first network communication protocol request is a threshold time of the first network communication protocol request.

9. The method as described in claim 5, wherein identifying records within a threshold of the first network communication protocol request includes selecting a subset of records within the data store to detect a second request.

10. The method as described in claim 5, further including determining if a first advertisement associated with the first network communication protocol request is detected within a third threshold of a second advertisement on a displayed webpage.

11. The method as described in claim 5, further including identifying a panelist associated with the first network communication protocol request.

12. The method as described in claim 5, further including identifying a device associated with the first network communication protocol request.

13. The method as described in claim 5, wherein the first network communication protocol request is a hypertext transfer protocol (HTTP) request.

14. A tangible machine-readable storage medium comprising instructions which, when executed, cause a machine to at least:
- identify a first network communication protocol request received at a proxy server for Internet communications, the first network communication protocol request directed to a first advertising server;
- search a data store storing requests received at the proxy server to identify records within a first threshold of the first network communication protocol request to detect a second network communication protocol request;
- detect a response to the second network communication protocol request;
- identify a parent advertiser based on content of the response to the second network communication protocol request;
- in response to identifying the parent advertiser, search the data store to identify records within a second threshold of the second network communication protocol request to determine if the second network communication protocol request was directed to the parent advertiser; and
- record a click-through event or a non-click-through event as a result of the searching.

15. The machine-readable storage medium as described in claim 14, wherein a number of records within the first threshold of the first network communication protocol request is fewer than a number of records in the data store.

16. The machine-readable storage medium as described in claim 14, further including instructions which, when executed, cause the machine to determine if a first advertisement associated with the first network communication protocol request is placed within a third threshold of a second advertisement on a displayed webpage.

17. The machine-readable storage medium as described in claim 14, further including instructions which, when executed, cause the machine to identify a panelist associated with the first network communication protocol request.

18. The machine-readable storage medium as described in claim 14, further including instructions which, when executed, cause the machine to identify a device associated with the first network communication protocol request.

19. The machine-readable storage medium as described in claim 14, wherein the first network communication protocol request is a hypertext transfer protocol (HTTP) request.

20. The machine-readable storage medium as described in claim 14, further including instructions which, when executed, cause the machine to select a subset of records within the data store to detect a second request.

21. An apparatus comprising:
- at least one memory;
- instructions in the apparatus; and
- processor circuitry to execute the instructions to:
  - identify a first network communication protocol request received at a proxy server for Internet communications, the first network communication protocol request directed to a first advertising server;
  - search a data store storing requests received at the proxy server to identify records within a first threshold of the first network communication protocol request to detect a second network communication protocol request;
  - detect a response to the second network communication protocol request;
  - identify a parent advertiser based on content of the response to the second network communication protocol request;
  - in response to identifying the parent advertiser, search the data store to identify records within a second threshold f the second network communication protocol request to determine if the second network communication protocol request was directed to the parent advertiser; and
  - record a click-through event or a non-click-through event as a result of the searching.

22. The apparatus as described in claim 21, wherein the processor circuitry is to filter requests received by the proxy server to prevent filtered requests from being processed.

23. The apparatus as described in claim 21, wherein the processor circuitry is to identify a user associated with the first network communication protocol request.

24. The apparatus as described in claim 21, wherein the processor circuitry is to identify a device associated with the first network communication protocol request.

* * * * *